(12) United States Patent
Mestdagh

(10) Patent No.: US 9,712,361 B2
(45) Date of Patent: Jul. 18, 2017

(54) METHOD FOR GENERATING A BUILT SYMBOL FOR PAPR REDUCTION AND A METHOD FOR DEMODULATING A RECEIVED SYMBOL

(71) Applicant: GREENWAVES TECHNOLOGIES, Villard-Bonnot (FR)

(72) Inventor: Denis Julien Gilles Mestdagh, Seyssins (FR)

(73) Assignee: GREENWAVES TECHNOLOGIES, Villard-Bonnot (FR)

( * ) Notice: Subject to any disclaimer, the term of this patent is extended or adjusted under 35 U.S.C. 154(b) by 0 days.

(21) Appl. No.: 14/916,071

(22) PCT Filed: Sep. 2, 2014

(86) PCT No.: PCT/EP2014/068630
§ 371 (c)(1),
(2) Date: Mar. 2, 2016

(87) PCT Pub. No.: WO2015/028684
PCT Pub. Date: Mar. 5, 2015

(65) Prior Publication Data
US 2016/0197756 A1     Jul. 7, 2016

(30) Foreign Application Priority Data
Sep. 2, 2013   (EP) ..................................... 13182699

(51) Int. Cl.
*H04L 27/26* (2006.01)
(52) U.S. Cl.
CPC ...... *H04L 27/2615* (2013.01); *H04L 27/2607* (2013.01); *H04L 27/2614* (2013.01);
(Continued)

(58) Field of Classification Search
CPC ............. H04L 27/2615; H04L 27/2607; H04L 27/2614; H04L 27/2627; H04L 27/2649
See application file for complete search history.

(56) References Cited

U.S. PATENT DOCUMENTS

| | | | | |
|---|---|---|---|---|
| 2009/0086848 | A1* | 4/2009 | Han | ...................... H04L 5/0023 375/295 |
| 2010/0091900 | A1* | 4/2010 | Gan | ..................... H04L 27/2615 375/267 |
| 2014/0362934 | A1* | 12/2014 | Kumar | ................ H04L 27/2602 375/260 |

OTHER PUBLICATIONS

Mar. 6, 2015 Search Report issued in International Patent Application No. PCT/EP2014/068630.
(Continued)

*Primary Examiner* — Jaison Joseph
(74) *Attorney, Agent, or Firm* — Oliff PLC

(57) ABSTRACT

Method for generating a built-symbol including plurality of sub-symbols for transmission including data of an original symbol of an orthogonal multi-carrier modulation-signal reducing the peak-to-average power-ratio (PAPR) and increase its robustness against Doppler-effects of the orthogonal multi-carrier modulation-signal, the original symbol lasting a duration, Ts and carried by N-tones; also including: applying intrinsic temporal diversity properties of complex N-points Inverse-Fast-Fourier-Transform to the original symbol, where plurality of sub-symbols number is M, each M sub-symbols lasts Ts/M and is carried by N/M disjoint-tones, the M sub-symbols are time-multiplexed, so the time-multiplexed built-symbol contains all-data at the same rate of the original symbol. The built-symbol is demodulated, utilizing an orthogonal multi-carrier receiver. Demodulating the received built-symbol including the M sub-symbol by demodulating sequentially sub-symbol by sub-symbol, improving the signal against Doppler-effects robustness. Step of increasing secrecy at the communication
(Continued)

system physical-layer by taking the unique properties applied the time-multiplexed built-symbol for transmission.

9 Claims, 13 Drawing Sheets

(52) U.S. Cl.
CPC ...... *H04L 27/2627* (2013.01); *H04L 27/2649* (2013.01); *H04L 27/2602* (2013.01)

(56) References Cited

OTHER PUBLICATIONS

Mar. 6, 2015 Written Opinion issued in International Patent Application No. PCT/EP2014/068630.

* cited by examiner

METHOD FOR GENERATING A BUILT SYMBOL FOR PAPR REDUCTION AND A METHOD FOR DEMODULATING A RECEIVED SYMBOL

TECHNICAL FIELD

The present invention relates generally to a communication signal processing method and, more particularly, relates to a communication signal processing method capable of reducing a peak-to-average power ratio (PAPR) value of a signal, of improving the robustness against Doppler effects of a signal, and of providing physical-layer secrecy of the data communication system.

BACKGROUND

OFDM is nowadays a mainstream modulation choice for most modern broadband communication systems in use, whether wireline or wireless. The main reason is that OFDM provides the best usage of the available frequency band since it maximizes the spectral efficiency. Moreover, one of other main advantages of OFDM over single carrier modulation is the easy mitigation of inter-symbol interference without having to resort to elaborate equalization, robustness in multipath wireless propagation channels, resilience to impulsive noise and narrowband ingress, and coexistence with legacy services because of spectral compactness and fine frequency granularity.

However, OFDM has a major drawback of having a large peak-to-average power ratio (PAPR). The large PAPR appears as a consequence of the nature of a multicarrier OFDM signal. Namely, when N modulated tones of the OFDM signal add together, the peak magnitude might have a value of N or even larger at a certain point in time if all tones add constructively, while the average might be quite low due to interferences between all modulated tones with independent amplitudes and phases.

The PAPR issue in OFDM systems can be simply understood by considering the example of an M-ary PSK modulation per tone. In this case, there are at most $M^2$ patterns amongst $M^N$ that yield the highest PAPR, namely, N.

PAPR values for N=2, 4, 8, 16, 32, 64, 128, 256, 512, 1024, 2048 and QPSK modulation per tone is listed in the following Table 1. The PAPR value increases by 3 dB per octave in the number of tones (i.e., each time we double the number of tones).

Among the existing PAPR-reduction approaches, the Selective Mapping (SLM) method is considered as one of the most popular and effective approaches. According to the document <<A Method to Reduce the Probability of Clipping in DMT-Based Transceivers>> by Denis J. G. Mestdagh and Paul M. P. Spruyt (IEEE Transactions on Communications, vol. 44, n. 10, pp. 1234-1238, October 1996), the SLM method comprising at steps of generating L statistically independent input data sequences which represent the same information, processing each input data sequence by utilizing L parallel N-IFFT to generate L time-domain OFDM symbols, and selecting, among the time-domain OFDM symbols, one symbol with the smallest PAPR for transmission.

The key point of the SLM method lies in how to generate multiple distinct time-domain OFDM symbols when the input data for transmission is the same. For this purpose, L pseudo-random phase rotation sequences $\Psi_l = [\Psi_{l,0}\ \Psi_{l,1}\ \ldots\ \Psi_{l,N-1}]^T$ with l=1, 2, ..., L are defined; where $\Psi_{l,k} = e^{j\psi_{l,k}}$ and $\psi_{l,k}$ is uniformly distributed in [0, 2π]. This process can be seen as performing a dot product operation on the input tones X(k) with rotation factor $e^{j\psi_{l,k}}$. In practice, all the elements of the phase sequence $\Psi_1$ are set to 1 to as to make this branch sequence the original OFDM symbol. The complexity of the original SLM is usually too high to be acceptable in actual implementations. In order to reduce the complexity of the conventional SLM scheme, several modified SLM methods using conversion matrices that can relieve the requirement of multiple N-IFFTs have been proposed.

The most interesting one is the so-called <<TSCM-SLM>> method, which is described in a document <<A Low-Complexity SLM Approach Based on Time-domain Sub-block Conversion Matrices for PAPR Reduction>> by Y.-R. Tsai, C.-H. Lin and Y.-C. Chen (IEEE Symposium on Computers and Communications (ISCC), pp. 579-584, June 2011). Nevertheless, in order to significantly reduce the computational complexity, the independancy of the available candidate OFDM signals is compromised and the effectiveness of PAPR reduction according to the TSMC-SLM method is degraded. For example, as shown in FIGS. 6 and 7 of the above-mentioned document, the conventional SLM method provides a greater PAPR reduction than the TSCM-SLM method. In the example of N being 256, the degradation is about 0.9 dB.

TABLE 1

PAPR values for several typical values of N when a QPSK modulation is applied to each tone.

| | N | | | | | | | | | | |
|---|---|---|---|---|---|---|---|---|---|---|---|
| | 2 | 4 | 8 | 16 | 32 | 64 | 128 | 256 | 512 | 1024 | 2048 |
| PAPR | 3 dB | 6 dB | 9 dB | 12 dB | 15 dB | 18 dB | 21 dB | 24 dB | 27 dB | 30 dB | 33 dB |

To decrease the power consumption and to prolong the battery life and save the system power, we need to seek to lower PAPR significantly.

A high PAPR impacts the implementation complexity and the power dissipation. Numerous approaches utilized to reduce the PAPR value have been proposed during the previous two to three decades and are still under thorough studies.

It should be noted, however, that none of the known approaches provide a global solution concerning the desired (or mandatory) features and/or advantages listed here below:

Very high PAPR value and its complementary cumulative distribution function (CCDF(PAPR)), Deterministic PAPR and CCDF(PAPR) reduction capability, No iteration required at the transmitter nor at the receiver, Low to very-low implementation complexity at both of the transmitter and the receiver,
No loss of capacity,
No need to increase the transmit power,
No need of transmitter to receiver side information,
No bandwidth expansion,
Neither in-band distortion nor out-of-band leakage,
Backward compatible with a conventional-OFDM mode of operation.

Actually, there is a big need for a holistic approach by considering the sum of the analogue and the digital transceiver's power consumption. Indeed, it would be useless to implement complex and heavy-computational-load PAPR reduction digital methods whose effects would lead to a situation where the contributions to the power consumption are changing fundamentally in a way that the digital signal processing becomes the dominant part of the overall consumption. While scaling of silicon-based processor efficiency with the help of Moore's law is approaching physical limits, the wireless communications need a new approach to significantly reduce the PAPR value while performing minimal low power signal processing computations. This is actually what the present invention is all about. In addition, according to the present invention, the system is more robust against Doppler effects and provides a means to increase the secrecy at the physical-layer of the communication system.

Reducing the PAPR value, and in the best case minimizing it, allows a power consumption reduction of the power amplifier and the digital-to-analog converter(s) (DAC(s)) when the average signal power must be kept fixed. On the other hand, higher average signal power can be transmitted for a fixed amplifier power supply $P_{DC}$ and thus improving the overall signal-to-noise ratio (SNR), and consequently the BER at the receiver, allowing a larger wireless coverage from, for example, the base stations of broadcasters or base stations of cellular mobile network operators.

SUMMARY

The invention concerns a method for generating a built symbol comprising a plurality of sub-symbols for transmission comprising data of an original symbol of an orthogonal multi-carrier modulation signal in order to reduce the peak-to-average power ratio (PAPR) of the orthogonal multi-carrier modulation signal, the original symbol lasting for a duration $T_S$ and carried by N tones; the method comprising: by applying intrinsic temporal diversity properties of the complex N-points Inverse Fast Fourier Transform to the original symbol, generating the plurality of sub-symbols from the original symbol, wherein the number of the generated plurality of sub-symbols is M, the M generated sub-symbols are time-multiplexed (sometimes referred to as <<concatenation>>), each of the M generated sub-symbol lasting for a duration $T_S/M$ and carried by N/M orthogonal tones.

According to a preferred embodiment, the original symbol is an OFDM symbol.

The intrinsic temporal diversity properties applied to the time-domain samples of the original symbol implies that each of the M sub-symbols carries disjoint tone sub-sets, each of the tone sub-sets contained in a sub-symbol comprising N/M orthogonal tones. The time-multiplexed built symbol obtained by performing the method of the invention for transmission contains all the data of the original symbol.

It should be noted that, by applying the temporal diversity algorithms to the time-domain output samples of an OFDM N-IFFT modulator without having to resort to tones partitioned into sub-blocks at the inputs of the IFFT modulator, the tones of the original symbol is partitioned into disjoint tone sub-sets respectively contained in each of the M sub-symbols.

Preferably, a specific Cyclic Prefix (CP) is prepended to the built symbol generated by time-multiplexing the M sub-symbols for transmission.

Preferably, a specific Cyclic Suffix (CS) is appended to the built symbol generated by time-multiplexing the M sub-symbols for transmission.

In one aspect, the present invention relates to a computer-program product that contains software program instructions, where execution of the software program instructions by at least one data processor results in performance said method for generating a built symbol.

The invention also concerns a transmitter configured to perform the above-mentioned method for generating a built symbol, and a receiver configured to perform a method for demodulating a received built symbol generated by performing said method for generating a built symbol.

The M selected sub-symbols are preferably time-multiplexed without guard interval between any two adjacent sub-symbols of the M selected sub-symbols of the built symbol for transmission.

The invention also concerns a transmitter configured to perform the above-mentioned method for generating a built symbol, and a receiver configured to perform a method for demodulating the built symbol generated by said method for generating a built symbol.

Since each of the time-multiplexed sub-symbols contains only N/M data-modulated tones, the PAPR of the built symbol is divided by the deterministic factor M. Moreover, since the built symbol utilises all of the N tones of the original symbol, and the built symbol lasts also for the duration $T_S$ of the original symbol, there is thus no loss of capacity.

The invention is preferably applied to process a time-multiplexed multi-carrier modulation signal, such as an OFDM signal.

The invention is also preferably applied to process a time-multiplexed orthogonal multi-carrier modulation signal, such as <<Discrete Multi-Tone>> (DMT) signal without departing from the scope of the present invention.

In addition, the terminology <<tone>> utilized in the description of the present invention is considered as an equivalent to the terminology <<sub-carrier>>. Both terminologies can effectively be utilized for OFDM systems and for DMT systems although according to some people skilled in the art, the terminology <<sub-carrier>> is more commonly used for OFDM-based systems while the terminology <<tone>> is more commonly used for DMT-based systems.

For the ease of reading and comprehension, the term <<tone>> is utilized in the description of the present invention.

In OFDM-based systems, each tone is modulated with the same input data constellations (e.g. all tones carry either QPSK, 8-QAM, 16-QAM, 32-QAM, 64-QAM, and so forth). In DMT-based systems, each tone may be modulated with different input data constellations according the Signal-to-Noise Ratio (SNR) at the receiver (the higher the SNR of the receiver, the higher the constellation order of the input data). For example, a high constellation order such as 2048-QAM can be transmitted when the SNR is sufficiently high, while a low constellation order such as QPSK or 8-QAM should be transmitted when the SNR of the receiver is low.

The input data constellation orders are determined in order to provide the same Bit-Error-Rate (BER) for every tone. DMT-based systems require the information of the receiver SNR per tone that needs a bidirectional communication to inform the transmitter about the receiver SNR on each tone. OFDM-based systems do not require a mandatory bidirectional communication and are commonly utilized in broadcast, including cellular multimedia communication systems, for instance.

In one example of embodiment according to the invention, the built symbol is demodulated by a receiver that performs inverse digital temporal-diversity operations that are already performed by the transmitter, in order to reconstruct, with pre-determined complex-number arithmetic operations, the time-domain samples. Therefore, the N samples of the built symbol are equal to the N samples of the original symbol at the same rate. Furthermore, in this case, an OFDM receiver can be utilized for demodulating the built symbol.

In addition to the above-mentioned method of demodulation, in one example of embodiment, another method for demodulating a built symbol generated by performing the above-mentioned method for generating a built symbol is disclosed, comprising: demodulating the M sub-symbols of the built symbol by processing <<sub-symbol by sub-symbol>> sequentially (i.e., chronologically according to the ordering of the sub-symbols that are time-multiplexed to generate the built symbol for transmission).

Compared with an OFDM system, such receiver allows to transmit and receive high throughput built symbols in very high Doppler spread channels.

The invention keeps all the advantages of an OFDM system, with additional advantages of a significant reduction of the PAPR and its complementary cumulative distribution function (CCDF) with insignificant additional arithmetic computations. Moreover, as a result of PAPR reduction, the invention allows a significant simplification of the analogue functional part of the transmitter (e.g., very significant reduction of an Input-Back-Off (IBO) and/or Output-Back-Off (OBO) of a power amplifier of the transmitter, a reduced number of resolution bits and/or a reduced dynamic range of the Digital-to-Analogue Converter(s) (DAC(s)), resulting in a very low power consumption as well as a very low implementation complexity. The invention proposes thus a very low-cost and a very low-power OFDM solution.

In one aspect, the present invention relates to a computer-program product that contains software program instructions, where execution of the software program instructions by at least one data processor results in performance said method of demodulation.

In one aspect, the present invention relates to a system comprising a transmitter and a receiver according to the invention.

BRIEF DESCRIPTION OF THE DRAWINGS

The foregoing and other aspects of the embodiments of the present invention are made more evident in the following Detailed Description, when read in conjunction with the attached Figures, wherein.

according to an embodiment of the present invention.

Figure 10:
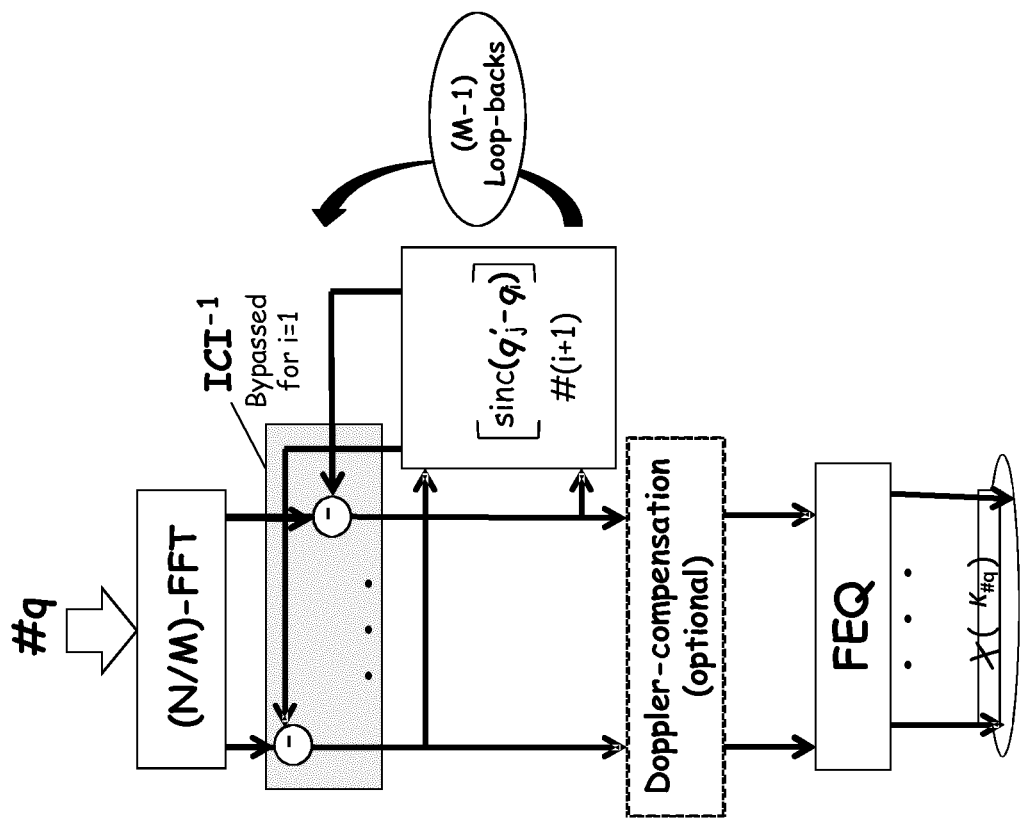

FIG. 10 illustrates a receiver macroblock architecture comprising an optional Doppler-compensation macroblock with the loop-back configuration according to an embodiment of the invention.

Figure 11:
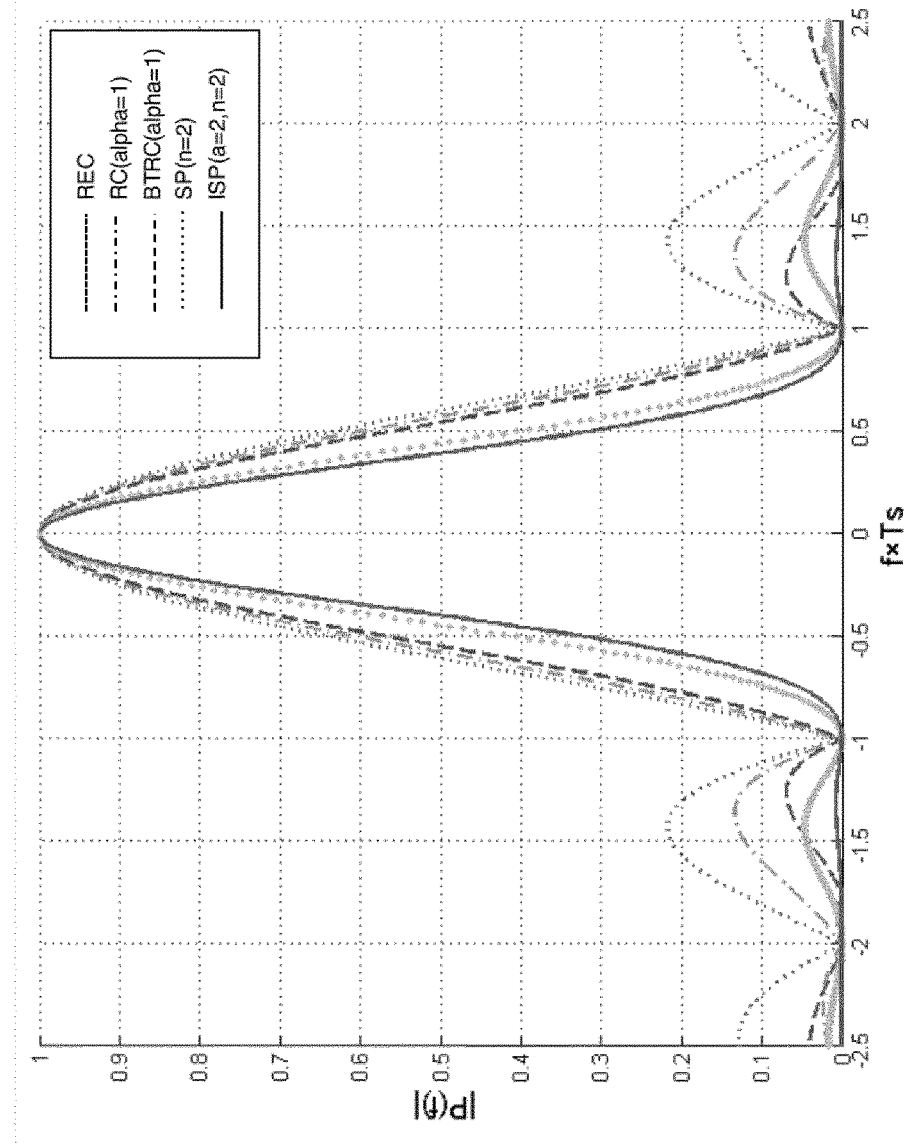

FIG. 11 presents a comparison of the pulse shaping REC, RC, BTRC, SP, and ISP spectrum according to an embodiment of the invention.

Figure 12:
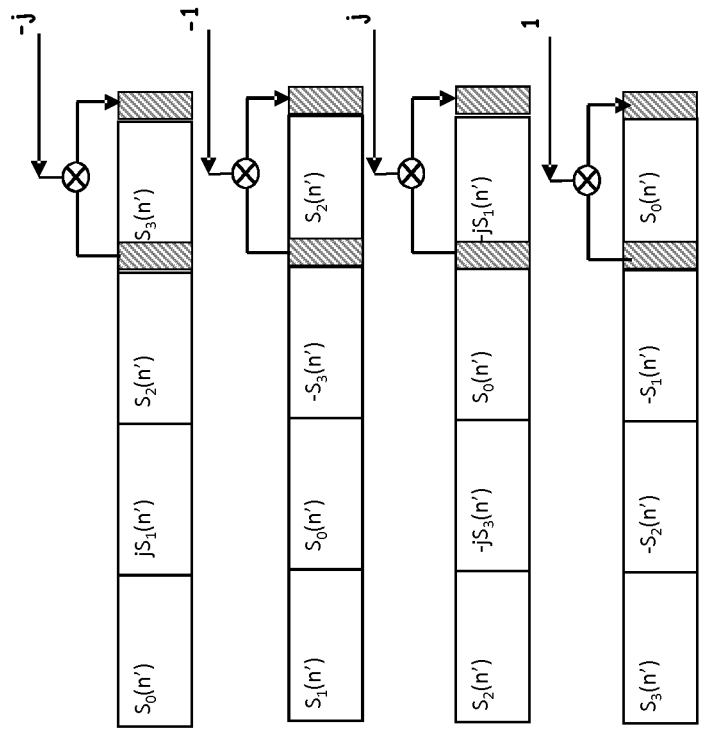

FIG. 12 illustrates a step of the method for appending a cyclic suffix to the time-multiplexed built symbol according to an embodiment of the present invention.

Figure 13:
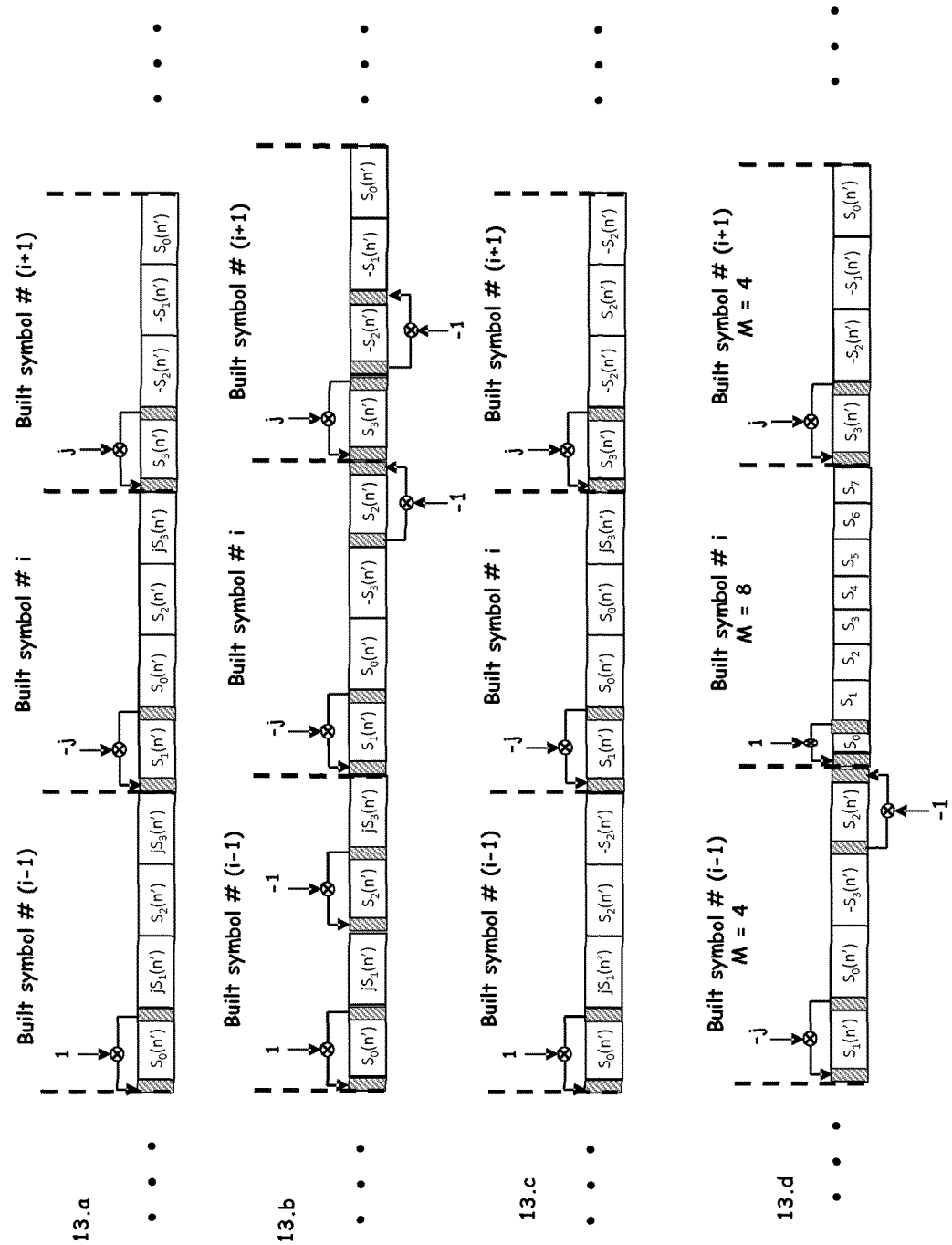

FIGS. 13.a, 13.b, 13.c and 13.d illustrate four alternative steps of increasing the secrecy at the physical-layer of the communication system based on the structure of the time-multiplexed built symbols for transmission, according to an embodiment of the present invention.

DETAILED DESCRIPTION

The invention provides a method for rebuilding at least one symbol of a multi-carrier modulation signal for data transmission in order to reduce a peak-to-average power ratio (PAPR) of the multi-carrier modulation signal. Some advantageous features and steps will be described below. Then some exemplary embodiments and use cases will be further detailed in regard with the drawings.

Before beginning a detailed review of embodiments of the present invention, the optional features listed below can be all or partially utilized to solve at least partially the previously mentioned technical problem:
the M selected sub-symbols are time-multiplexed;
the orthogonal multi-carrier modulation signal is an orthogonal frequency-division multiplexing (OFDM) signal;

there are M! permutations during the step of time-multiplexing the selected M candidate sub-symbols to built the symbol for transmission;

the built symbol is preferably prepended with a specific cyclic prefix guard interval lasting at least the maximum delay spread of a multipath propagation channel;

the built symbol is preferably appended with a specific cyclic suffix lasting at least a duration for performing OFDM symbol shaping;

the built symbol is demodulated by an orthogonal multi-carrier receiver by applying an inverse of transmitter's temporal-diversity arithmetic computations to symbol samples of the built symbol received by a receiver to regenerate samples identical to symbol samples generated by an orthogonal multi-carrier receiver;

the sub-symbols of the time-multiplexed built symbol are demodulated <<sub-symbol by sub-symbol>> in a chronological way;

an inter-carrier interference (ICI) cancellation stage utilized for removing an ICI noise between any two adjacent sub-symbols of the built symbol, the two adjacent sub-symbols respectively carried by two distinct tone sub-sets TS-A and TS-B comprising respectively N/M tones; the ICI cancellation stage comprising: calculating a sum of vectors (i.e. amplitudes and phases) of the tone sub-set TS-A (main lobes and side lobes) that overlap a tone of the tones sub-set TS-B; generating a result by subtract said sum that is the ICI noise on the said tone of the tones sub-set TS-B;

the result is calculated offline and stored in a memory before demodulating;

performing a pulse shaping process on each of the built symbol;

performing distinct steps and/or a combination of the steps for increasing the secrecy at the physical-layer of the orthogonal multi-carrier communication system.

Briefly speaking, the method according to the invention is utilized for processing an original symbol of a multi-carrier modulation signal carried by N tones for data transmission in order to generate a built symbol to be transmitted by a transmitter to a receiver; the built symbol comprising M time-multiplexed sub-symbols lasting for a duration $T_S/M$, respectively, and carried by N/M tones, wherein $T_S$ is the duration of the original OFDM symbol, $M=2^p$, p is a positive integer.

According to a preferred embodiment, the original symbol is an OFDM symbol. The PAPR value during the transmission of the built symbol is thus reduced since now only N/M tones, instead of N tones, are added together.

The detailed steps of the invention will be described in the following paragraphs.

The method of the present invention is utilized for processing a multi-carrier modulation signal which is time-multiplexed, for example an orthogonal frequency-division multiplexing (OFDM) signal comprising at least an original OFDM symbol as described in the following embodiments. However, the method of the invention can be performed, without departing from the scope of the present invention, to process other types of time-multiplexed multi-carrier modulation signals such as a discrete multi-tone (DMT) signal.

Before providing a first embodiment of the invention of generating a built symbol comprising two sub-symbols (sections) carried by N/2 tones, a detailed derivation explaining the reasons to perform the steps of the method will be provided as below for the ease of the comprehension of the invention.

The following $x_k(n)$ of Eq. (1) represents time-domain samples of an original OFDM signal generated at the transmitter and carried by a $k^{th}$ modulated tone:

$$x_k(n) = \frac{1}{\sqrt{N}} \cdot X(k) \cdot \exp\left\{j\frac{2\pi}{N}k \cdot n\right\} \quad (1)$$

In a preferred embodiment, the transmitter is a complex N-point IFFT (Inverse Fast Fourier Transform) transmitter. The transmitter generates an OFDM symbol comprising time samples x(n) that are a summation of the N modulated-tones (e.g. QAM (Quadrature Amplitude Modulation)-modulated tones), so that:

$$x(n)=\Sigma_{k=0}^{N-1}x_k(n) \quad (2)$$

The N tones can be divided into two distinct tone sub-sets, one of the tone sub-sets comprises only even tones and represented as the tone sub-set of even tones $\{k_{\#0}\}=2m$, and the other tone sub-set comprises only odd tones and represented as the tone sub-set of odd tones $\{k_{\#1}\}=2m+1$, wherein $m \in \mathbb{N}^+$ (m=0, 1, 2, ... ).

Eq. (2) can be thus expressed by a summation of contributions from the tone sub-set of even tones $\{k_{\#0}\}$ and the tone sub-set of odd tones $\{k_{\#1}\}$:

$$x(n)=\Sigma_{k\in\{k_{\#0}\}}x_k(n)+\Sigma_{k\in\{k_{\#1}\}}x_k(n)=x_{\{k_{\#0}\}}(n)+x_{\{k_{\#1}\}}(n) \quad (3)$$

For each even tone $\epsilon\{k_{\#0}\}$, we have for $$n' = 0, 1, \dots \left(\frac{N}{2}-1\right):$$

$$x_{\{k_{\#0}\}}(n') = \frac{1}{\sqrt{N}}X(k_{\{k_{\#0}\}}) \cdot \exp\left\{j\frac{2\pi}{N}n'k_{\{k_{\#0}\}}\right\} \quad (4)$$

and $$\begin{aligned}x_{\{k_{\#0}\}}\left(\frac{N}{2}+n'\right) &= \frac{1}{\sqrt{N}}X(k_{\{k_{\#0}\}}) \cdot \exp\left\{j\frac{2\pi}{N}\left(\frac{N}{2}+n'\right)k_{\{k_{\#0}\}}\right\} \\ &= \frac{1}{\sqrt{N}}X(k_{\{k_{\#0}\}}) \cdot \exp\left\{j\frac{2\pi}{m}n'k_{\{k_{\#0}\}}\right\} \cdot \exp\{j\pi k_{\{k_{\#0}\}}\} \\ &= \frac{1}{\sqrt{N}}X(k_{\{k_{\#0}\}}) \cdot \exp\left\{j\frac{2\pi}{N}n'k_{\{k_{\#0}\}}\right\} \cdot \exp\{j2m\pi\} \\ &= x_{\{k_{\#0}\}}(n')\end{aligned} \quad (5)$$

Therefore, the contribution from all of the even tones yields a periodic time sample sequence of period N/2 verifying:

$$x_{\{k_{\#0}\}}\left(\frac{N}{2}+n'\right) = x_{\{k_{\#0}\}}(n') \quad (6)$$

for all $n' = 0, 1, \dots, \left(\frac{N}{2}-1\right)$

For each odd tone $\epsilon\{k_{\#1}\}$, we have:

$$x_{\{k_{\#1}\}}(n') = \frac{1}{\sqrt{N}}X(k_{\{k_{\#1}\}}) \cdot \exp\left\{j\frac{2\pi}{N}n'k_{\{k_{\#1}\}}\right\} \quad (7)$$

and

-continued $$x_{\{k_{\#1}\}}\left(\frac{N}{2}+n'\right) = \frac{1}{\sqrt{N}}X(k_{\{k_{\#1}\}})\cdot\exp\left\{j\frac{2\pi}{N}\left(\frac{N}{2}+n'\right)k_{\{k_{\#1}\}}\right\} \quad (8)$$

$$= \frac{1}{\sqrt{N}}X(k_{\{k_{\#1}\}})\cdot\exp\left\{j\frac{2\pi}{m}n'k_{\{k_{\#1}\}}\right\}\cdot\exp\{j\pi k_{\{k_{\#1}\}}\}$$

$$= \frac{1}{\sqrt{N}}X(k_{\{k_{\#1}\}})\cdot\exp\left\{j\frac{2\pi}{N}n'k_{\{k_{\#1}\}}\right\}\cdot$$

$$\exp\{j\pi(2m+1)\} = -x_{\{k_{\#1}\}}(n')$$

Thus, the contribution from all of the odd tones yields an anti-periodic time sample sequence verifying:

$$x_{\{k_{\#1}\}}\left(\frac{N}{2}+n'\right) = -x_{\{k_{\#1}\}}(n') \quad (9)$$

$$\text{for } n' = 0, 1, \ldots, \left(\frac{N}{2}-1\right)$$

Due to the temporal-diversity properties of the original OFDM symbol and the above-mentioned calculation, the Eq. (6) and Eq. (9) reveal that the above-mentioned time-multiplexed sections (sub-symbols) $x_{\{k_{\#0}\}}(n')$ and $x_{\{k_{\#1}\}}(n')$ carry the same data information than the above-mentioned time-multiplexed sections $$x_{\{k_{\#0}\}}\left(\frac{N}{2}+n'\right)$$

and $$x_{\{k_{\#1}\}}\left(\frac{N}{2}+n'\right),$$

respectively.

Therefore, instead of transmitting the original OFDM symbol given by Eq. (2), we can transmit a built symbol formed by the time-multiplexed section $x_{\{k_{\#0}\}}(n')$ followed by the time-multiplexed section $$x_{\{k_{\#1}\}}\left(\frac{N}{2}+n'\right)$$

without any loss of capacity. The built symbol can be formed in another way by permuting the ordering of the multiplexed sections; that means the built symbol can be formed by the time-multiplexed section $x_{\{k_{\#1}\}}(n')$ followed by the time-multiplexed section $$x_{\{k_{\#0}\}}\left(\frac{N}{2}+n'\right).$$

For the ease of the comprehension of the following description, a notation $s_{\{k_{\#q}\}}(n')$ (q=0, 1, ..., M−1) is utilized for representing a time-multiplexed section (sub-symbol) carried either by a tone sub-set of even tones (q=0, 2, 4, ...) or by a tone sub-set of odd tones (q=1, 3, 5, ...); the section $s_{\{k_{\#q}\}}(n')$ contains a portion of time samples of the built symbol chosen for transmission.

The temporal-diversity properties of the OFDM signals provide a very simple means to generate the built symbol from the output samples of the N-point IFFT transmitter. Indeed, according to Eq. (2) and Eq. (3), the N outputs of the N-point IFFT transmitter are given by:

$$x(n') \mapsto x\left(\frac{N}{2}+n'\right) = \quad (10)$$

$$[x_{\{k_{\#0}\}}(n')+x_{\{k_{\#1}\}}(n')] \mapsto \left[x_{\{k_{\#0}\}}\left(\frac{N}{2}+n'\right)+x_{\{k_{\#1}\}}\left(\frac{N}{2}+n'\right)\right]$$

where "$\mapsto$" indicates time-multiplexing; i.e., the samples x(N/2+n') will be transmitted later than the samples x(n') with n'=0, 1, ..., (N/2−1).

Then, using Eq. (6) and Eq. (9) into Eq. (10), we obtain:

$$s_{\{k_{\#0}\}}(n') = \frac{1}{2}\left(x(n')+x\left(\frac{N}{2}+n'\right)\right) \quad (11.1)$$

$$s_{\{k_{\#0}\}}\left(\frac{N}{2}+n'\right) = \frac{1}{2}\left(x(n')+x\left(\frac{N}{2}+n'\right)\right) \quad (11.2)$$

$$s_{\{k_{\#1}\}}(n') = \frac{1}{2}\left(x(n')-x\left(\frac{N}{2}+n'\right)\right) \quad (11.3)$$

$$s_{\{k_{\#1}\}}\left(\frac{N}{2}+n'\right) = -\frac{1}{2}\left(x(n')-x\left(\frac{N}{2}+n'\right)\right) \quad (11.4)$$

from which the above-mentioned two possible combinations of two time-multiplexed sections (OFDM sub-symbols) for the built symbol are obtained, as the built symbol #1 in Eq. (12.1) and the built symbol #2 Eq. (12.2). The built symbol comprising N samples carrying the same data information at the same rate as the original OFDM symbol.

Figure 1:
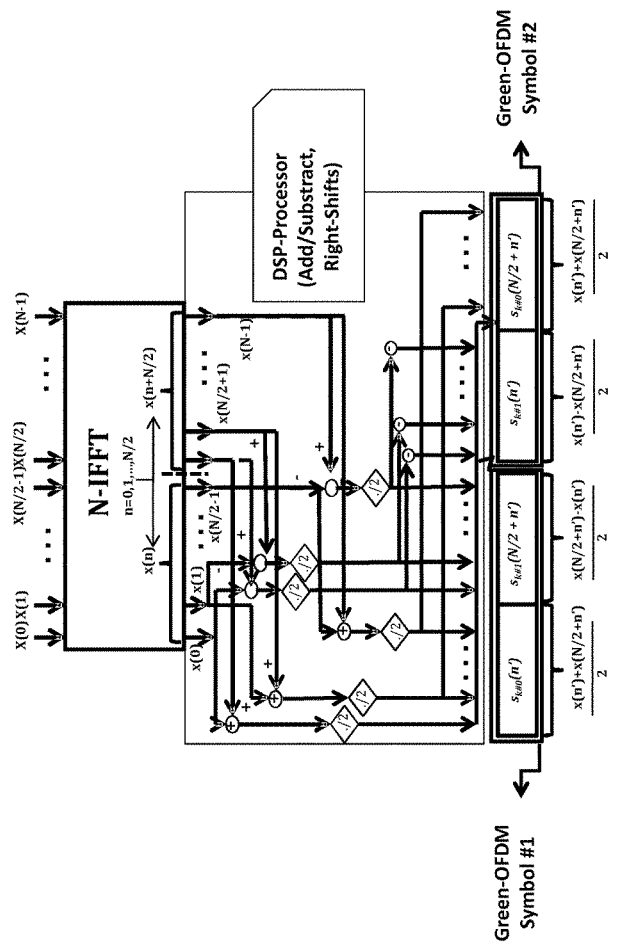
FIG. 1 illustrates the generation of two possible built symbols according to an embodiment of the present invention.
Figure 2:
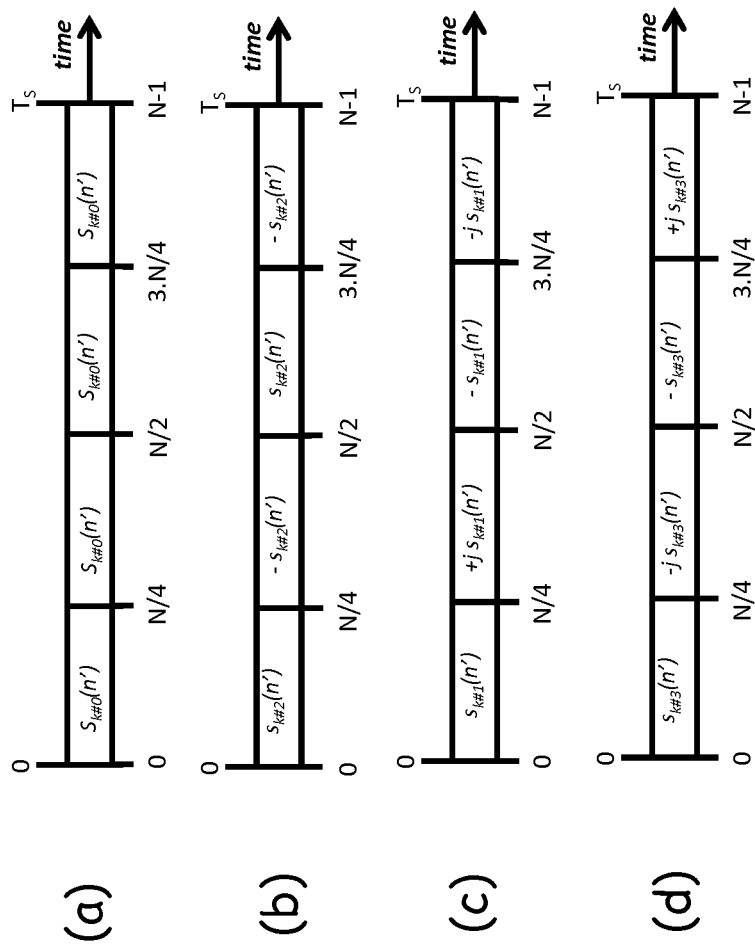
FIGS. 2(a) to 2(d) illustrate four different candidate sub-symbols sets respectively carried by four different tone sub-sets according to an embodiment of the present invention.

Built symbol #1: $s_{\{k_{\#0}\}}(n') \mapsto s_{\{k_{\#1}\}}\left(\frac{N}{2}+n'\right) \quad (12.1)$ Built symbol #2: $s_{\{k_{\#1}\}}(n') \mapsto s_{\{k_{\#0}\}}\left(\frac{N}{2}+n'\right) \quad (12.2)$ with $n' = 0, 1, \ldots, \left(\frac{N}{2}-1\right).$ It should be noted that Eqs. (11) require only elementary arithmetic operations, such as add/subtract, sign-reversal and division by a factor 2 (i.e., right-shift of binary words that code the samples of the original OFDM symbol), as shown in FIG. 1. FIG. 1 illustrates the generation of the two above-mentioned possible built symbols #1 and #2 according to an embodiment of the present invention.

The PAPR of the built symbol, no matter the built symbol #1 or the built symbol #2 is chosen to be transmitted instead of transmitting the original OFDM symbol, is reduced by 3 dB as compared with the PAPR of the original OFDM symbol because both of the two OFDM sub-symbols of the built symbol are time-multiplexed and carried by only N/2 modulated tones.

In a preferred embodiment, before being treated by an OFDM complex N-point FFT demodulator, the built symbol is first received and treated by the receiver that applies the inverse of a DSP process performed by the transmitter. Indeed, it is assumed first a back-to-back transmitter/receiver configuration. If the built symbol #1 is chosen for transmission, we have N output samples from analogue-to-digital converter(s) (ADCs) of the receiver given by:

$$r_{\{k_{\#0}\}}(n') \mapsto r_{\{k_{\#1}\}}\left(\frac{N}{2}+n'\right) = s_{\{k_{\#0}\}}(n') \mapsto s_{\{k_{\#1}\}}\left(\frac{N}{2}+n'\right) \quad (13)$$

Using Eq. (11.1) and Eq. (11.4), the N received samples from the output of the ADC(s) given by Eq. (13) are processed to provide:

$$x(n') = r_{\{k_{\#0}\}}(n') - r_{\{k_{\#1}\}}\left(\frac{N}{2} + n'\right) \quad (14.1)$$

$$x\left(\frac{N}{2} + n'\right) = r_{\{k_{\#0}\}}(n') + r_{\{k_{\#1}\}}\left(\frac{N}{2} + n'\right) \quad (14.2)$$

If the built symbol #2 is chosen for transmission instead of the built symbol #1, we have:

$$x(n') = r_{\{k_{\#1}\}}(n') + r_{\{k_{\#0}\}}\left(\frac{N}{2} + n'\right) \quad (14.3)$$

$$x\left(\frac{N}{2} + n'\right) = r_{\{k_{\#0}\}}\left(\frac{N}{2} + n'\right) - r_{\{k_{\#1}\}}(n') \quad (14.4)$$

Therefore, with this simple linear combination of the receiver's ADC(s) output time samples, we obtain a time-domain symbol that is fully compatible with existing OFDM demodulators.

The temporal-diversity properties of OFDM signals are not limited to the value of M=2. A second embodiment of the present invention wherein M=4 will be provided in the following paragraphs.

In the second embodiment, the built symbol comprising four time-multiplexed sections is generated by utilizing the intrinsic temporal-diversity properties of the N-IFFT, and each of the time-multiplexed section lasts for a duration $T_S/4$ ($T_S$=the duration of the built symbol=the duration of the original OFDM symbol). By clever introspect, each section of the built symbol contains only disjoint N/4 tones, the PAPR of the built symbol of the second embodiment is further decreased by 3 dB as compared with the built symbol of the first embodiment described previously. Compared with the original OFDM symbol that doesn't apply any PAPR reduction method, the time-multiplexed built symbol comprising four sub-symbols (M=4) leads to a PAPR reduction of 6 dB.

The temporal diversity properties of the N-IFFT modulator are utilized to generate the built symbol that automatically provides the tone partitioning given by Eqs. (15) below. In addition, by using Eq. (1) with the four tones sub-sets defined by Eqs. (15) and the intrinsic temporal diversity properties of the N-IFFT, any one of the four candidate sub-symbols sets (a) to (d) could be obtained. The four candidate sub-symbols sets (a) to (d) are respectively illustrated in the following Eqs. (16.a) to (16.d) and FIGS. 2(a) to 2(d).

In other words, by applying the temporal diversity properties of the N-IFFT at the transmitter, we generate sub-symbols, each containing implicitly a subset of the N tones of the original symbol. For example, with M=4, all even tones of the N tones are divided into two disjoint tone sub-sets of even tones, such as:

Sub-symbol #0 containing the tone sub-set #0:
$\{k_{\#0}\}=4m$ (15.1)

Sub-symbol #2 containing the tone sub-set #2:
$\{k_{\#2}\}=4m+2$ (15.2)

Similarly, all odd tones of the N tones are divided into two disjoint tone sub-sets of odd tones, such as:

Sub-symbol #1 containing the tone sub-set #1:
$\{k_{\#1}\}=4m+1$ (15.3)

Sub-symbol #3 containing the tone sub-set #3:
$\{k_{\#3}\}=4m+3$ (15.4)

wherein $m \in \mathbb{N}^+$ (m=0, 1, 2, . . . ).

(a) a first candidate sub-symbols (sections) set comprising the following four candidate sub-symbol carried by an even-tone sub-set $\{k_{\#0}\}$, n'=0, 1, . . . , $\left(\frac{N}{4} - 1\right)$:

$$s_{\{k_{\#0}\}}(n') = x_{\{k_{\#0}\}}(n') \quad (16.a)$$

$$s_{\{k_{\#0}\}}\left(\frac{N}{4} + n'\right) = x_{\{k_{\#0}\}}(n') = s_{\{k_{\#0}\}}(n')$$

$$s_{\{k_{\#0}\}}\left(\frac{N}{2} + n'\right) = x_{\{k_{\#0}\}}(n') = s_{\{k_{\#0}\}}(n')$$

$$s_{\{k_{\#0}\}}\left(\frac{3N}{4} + n'\right) = x_{\{k_{\#0}\}}(n') = s_{\{k_{\#0}\}}(n')$$

(b) a second candidate sub-symbols set carried by an even-tone sub-set $\{k_{\#2}\}$, n'=0, 1, . . . $\left(\frac{N}{4} - 1\right)$:

$$s_{\{k_{\#2}\}}(n') = x_{\{k_{\#2}\}}(n') \quad (16.b)$$

$$s_{\{k_{\#2}\}}\left(\frac{N}{4} + n'\right) = -x_{\{k_{\#2}\}}(n') = -s_{\{k_{\#2}\}}(n')$$

$$s_{\{k_{\#2}\}}\left(\frac{N}{2} + n'\right) = x_{\{k_{\#2}\}}(n') = s_{\{k_{\#2}\}}(n')$$

$$s_{\{k_{\#2}\}}\left(\frac{3N}{4} + n'\right) = -x_{\{k_{\#2}\}}(n') = -s_{\{k_{\#2}\}}(n')$$

(c) a third candidate sub-symbols set carried by an odd-tone sub-set $\{k_{\#1}\}$, n'=0, 1, . . . , $\left(\frac{N}{4} - 1\right)$:

$$s_{\{k_{\#1}\}}(n') = x_{\{k_{\#1}\}}(n') \quad (16.c)$$

$$s_{\{k_{\#1}\}}\left(\frac{N}{4} + n'\right) = +jx_{\{k_{\#1}\}}(n') = +js_{\{k_{\#1}\}}(n')$$

$$s_{\{k_{\#1}\}}\left(\frac{N}{2} + n'\right) = -x_{\{k_{\#1}\}}(n') = -s_{\{k_{\#1}\}}(n')$$

$$s_{\{k_{\#1}\}}\left(\frac{3N}{4} + n'\right) = -jx_{\{k_{\#1}\}}(n') = -js_{\{k_{\#1}\}}(n')$$

(d) a fourth candidate sub-symbols set carried by an odd-tone sub-set $\{k_{\#3}\}$, n'=0, 1, . . . , $$s_{\{k_{\#3}\}}(n') = x_{\{k_{\#3}\}}(n') \quad (16.d)$$

$$s_{\{k_{\#3}\}}\left(\frac{N}{4} + n'\right) = -jx_{\{k_{\#3}\}}(n') = -js_{\{k_{\#3}\}}(n')$$

$$s_{\{k_{\#3}\}}\left(\frac{N}{2} + n'\right) = -x_{\{k_{\#3}\}}(n') = -s_{\{k_{\#3}\}}(n')$$

$$s_{\{k_{\#3}\}}\left(\frac{3N}{4} + n'\right) = +jx_{\{k_{\#3}\}}(n') = +js_{\{k_{\#3}\}}(n')$$

The time-domain output samples of the N-IFFT are equal to the sum of Eqs. (16), i.e. [(16.a)+(16.b)+(16.c)+(16.d)] $\left(\text{with } n' = 0, 1, \ldots, \frac{N}{4} - 1\right)$.

The outputs of the complex N-IFFT transmitter are thus given by:

$$x(n') = s_{\{k_{\#0}\}}(n') + s_{\{k_{\#1}\}}(n') + s_{\{k_{\#2}\}}(n') + s_{\{k_{\#3}\}}(n') \quad (17.a)$$

$$x\left(\frac{N}{4} + n'\right) = s_{\{k_{\#0}\}}(n') + js_{\{k_{\#1}\}}(n') - s_{\{k_{\#2}\}}(n') - js_{\{k_{\#3}\}}(n') \quad (17.b)$$

$$x\left(2\frac{N}{4} + n'\right) = s_{\{k_{\#0}\}}(n') - s_{\{k_{\#1}\}}(n') + s_{\{k_{\#2}\}}(n') - s_{\{k_{\#3}\}}(n') \quad (17.c)$$

$$x\left(3\frac{N}{4} + n'\right) = s_{\{k_{\#0}\}}(n') - js_{\{k_{\#1}\}}(n') - s_{\{k_{\#2}\}}(n') + js_{\{k_{\#3}\}}(n') \quad (17.d)$$

$s_{\{k_{\#0}\}}(n')$ is obtained by performing an addition of Eqs. (17):

$$s_{\{k_{\#0}\}} = \frac{1}{4}\left[x(n') + x\left(\frac{N}{4} + n'\right) + x\left(\frac{N}{2} + n'\right) + x\left(3\frac{N}{4} + n'\right)\right] \quad (18)$$

Then, Eqs. (17) and Eqs. (18) provide:

$$x'\left(\frac{N}{4} + n'\right) = \quad (19.a)$$
$$x\left(\frac{N}{4} + n'\right) - s_{\{k_{\#0}\}}(n') = js_{\{k_{\#1}\}}(n') - s_{\{k_{\#2}\}}(n') - js_{\{k_{\#3}\}}(n')$$

$$x'\left(2\frac{N}{4} + n'\right) = \quad (19.b)$$
$$x\left(2\frac{N}{4} + n'\right) - s_{\{k_{\#0}\}}(n') = -s_{\{k_{\#1}\}}(n') + s_{\{k_{\#2}\}}(n') - s_{\{k_{\#3}\}}(n')$$

$$x'\left(3\frac{N}{4} + n'\right) = \quad (19.c)$$
$$x\left(3\frac{N}{4} + n'\right) - s_{\{k_{\#0}\}}(n') = -js_{\{k_{\#1}\}}(n') - s_{\{k_{\#2}\}}(n') + js_{\{k_{\#3}\}}(n')$$

The above Eqs. (19) can also be expressed in a matrix form (u'=1, 2, 3 is the row indice, and q'=1, 2, 3 is the column indice):

$$\left[x'\left(u'\frac{N}{4} + n'\right)\right] = \mathbb{M}_{(3\times 3)} \cdot \left[s_{\{k_{\#q'}\}}(n')\right] \quad (20)$$

where $$\mathbb{M}_{(3\times 3)} = \begin{bmatrix} j & -1 & -j \\ -1 & 1 & -1 \\ -j & -1 & j \end{bmatrix} \quad (21)$$

$\mathbb{M}_{(3\times 3)}$ is an invertible matrix since $\det(\mathbb{M}_{(3\times 3)}) = |\mathbb{M}_{(3\times 3)}| = -4j \neq 0$. Indeed, we have:

$$\mathbb{M}_{(3\times 3)}^{-1} = \frac{1}{4}\begin{bmatrix} -1-j & -2 & -1+j \\ -2 & 0 & -2 \\ -1+j & -2 & -1-j \end{bmatrix} \quad (22)$$

Using Eqs. (18) to (22), we have:

$$\left[s_{\{k_{\#q=0}\}}\right](n') = \quad (23.a)$$
$$\frac{1}{4}\begin{bmatrix}1 & 1 & 1 & 1\end{bmatrix} \cdot \left[x\left(u\frac{N}{4} + n'\right)\right] = \mathbb{G}_\mathbb{T}(u, q=0)\left[x\left(u\frac{N}{4} + n'\right)\right]$$

and $$\left[s_{\{k_{\#q\neq 0}\}}\right](n') = \quad (23.b)$$
$$\frac{1}{4}\begin{bmatrix} -1-j & -2 & -1+j \\ -2 & 0 & -2 \\ -1+j & -2 & -1-j \end{bmatrix} \cdot \left[x\left(u'\frac{N}{4} + n'\right) - s_{\{k_{\#q=0}\}}(n')\right] =$$
$$\mathbb{G}_\mathbb{T}(u', q\neq 0) \cdot \left[x\left(u'\frac{N}{4} + n'\right) - s_{\{k_{\#q=0}\}}(n')\right]$$

where $\mathbb{G}_\mathbb{T}(u, q=0)$ and $\mathbb{G}_\mathbb{T}(u', q\neq 0)$ with u=0, 1, 2, 3 and u'=1, 2, 3 are the generating matrices for all sections $s_{\{k_{\#0}\}}$, $s_{\{k_{\#1}\}}$, $s_{\{k_{\#2}\}}$, and $s_{\{k_{\#3}\}}$ from the output samples of the N-IFFT modulator used to generate the original OFDM signal. We can thus compute any of the four time-domain sections using Eqs. (23). Let us denote by $\mathbb{T}$ the linear digital signal processing to apply to the outputs of the N-IFFT modulator to obtain the time-domain samples of the sections $s_{\{k_{\#q}\}}(n')$ $\forall q$ and n'=0, 1, . . . $\left(\frac{N}{M} - 1\right)$.

We have:

$$s_{\{k_{\#q}\}}(n') = \mathbb{T} \cdot x\left(u\frac{N}{M} + n'\right) \quad (24)$$
$$\forall q \text{ and } u = 0, 1, \ldots, (M-1)$$

As expressed by Eqs. (17), the original OFDM time-domain samples can be reconstructed at the receiver from the ADC(s) outputs of the received symbols as (example is given for M=4):

$$\left[x\left(u\frac{N}{4}+n'\right)\right] = \begin{bmatrix} 1 & 1 & 1 & 1 \\ 1 & j & -1 & -j \\ 1 & -1 & 1 & -1 \\ 1 & -j & -1 & j \end{bmatrix} \cdot \left[s_{\{k_{\#q}\}}(n')\right] = \mathbb{R}(u,q) \cdot \left[s_{\{k_{\#q}\}}(n')\right] \quad (25)$$

It should be noted that according to a preferred embodiment, in order to enhance the system efficiency, neither $\mathbb{G}_\mathbb{T}(u, q=0)$, $\mathbb{G}_\mathbb{T}(u, q\neq 0)$ (and thus $\mathbb{T}$) nor $\mathbb{R}(u,q)$ would be computed dynamically in real time. Instead, $\mathbb{T}$ and $\mathbb{R}(u,q)$ are computed off-line with utilizing the information of the required parameters provided in the system specifications. The values of $\mathbb{T}$ and $\mathbb{R}(u,q)$ obtained after the above-mentioned computation are then stored in a memory device within the transceiver circuitry. Therefore, $s_{\{k_{\#q}\}}(n')$ $\forall q$ at the transmitter and $$x\left(u\frac{N}{4}+n'\right)$$

$\forall u$ at the receiver are obtained by performing simple arithmetical computations requiring merely adds/subtracts, divisions by factors 2, $\sqrt{2}$, etc (right-shift of binary words) and multiplies/divides by integer numbers and the complex coefficient "j".

In order to generate the built symbol, one sub-symbol from each of the 4 candidate sub-symbol sets is selected. Each selected sub-symbol lasts for a duration $T_S/4$ and carried by the N/M tones of the corresponding tone sub-set.

All of the four candidate sub-symbol sets participate in the composition of the built symbol, and there is no candidate sub-symbol set providing more than one sub-symbol for generating the built symbol. In addition, each of the four selected sub-symbols has a different value of u since the four selected sub-symbols contain respectively disjoint portions of the data contained in the original OFDM symbol.

It should be noted that $\mathbb{T}^{-1}(u,q)$ is preferably not computed dynamically in real time. Indeed, by system specifications we have the knowledge of required parameters to compute off-line $\mathbb{T}^{-1}(u,q)$ and then stored the obtained results in a memory within a transceiver circuitry. It is also noteworthy that there is no need of side information to be transmitted about a chosen permutation matrix $\mathbb{T}$ at the transmitter because the matrix $\mathbb{T}$ can also be able to be specified within the system specifications.

Therefore, $s_{\{k_{\#q}\}}(n')$ $\forall q$ are obtained by simple additional arithmetic computations requiring merely adds/subtracts, division by a factor 2 (right-shift of binary words) and multiplies/divides by a positive integer number and a complex coefficient "j". The above-mentioned additional arithmetic computations can be easily implemented by software using a very low power and a very low-cost DSP processor core on top of an OFDM transmitter. Furthermore, compared with the computations performed by an OFDM system without applying the method of the present invention to reduce the PAPR, the additional computations are negligible while maintaining the transmission throughput.

As a reminder, the data contained in the original OFDM symbol can be partitioned into four different portions respectively contained in a selected time-multiplexed sub-symbol of the built symbol, which is obtained by applying the intrinsic temporal-diversity properties. Thus, the value "u" of each selected sub-symbols indicates its corresponding time-domain portion of the data contained in the original OFDM symbol.

Hence, there are 4!=24 different combinations of time-multiplexed sections (OFDM sub-symbols) to form the built symbol for transmission.

Figure 3:
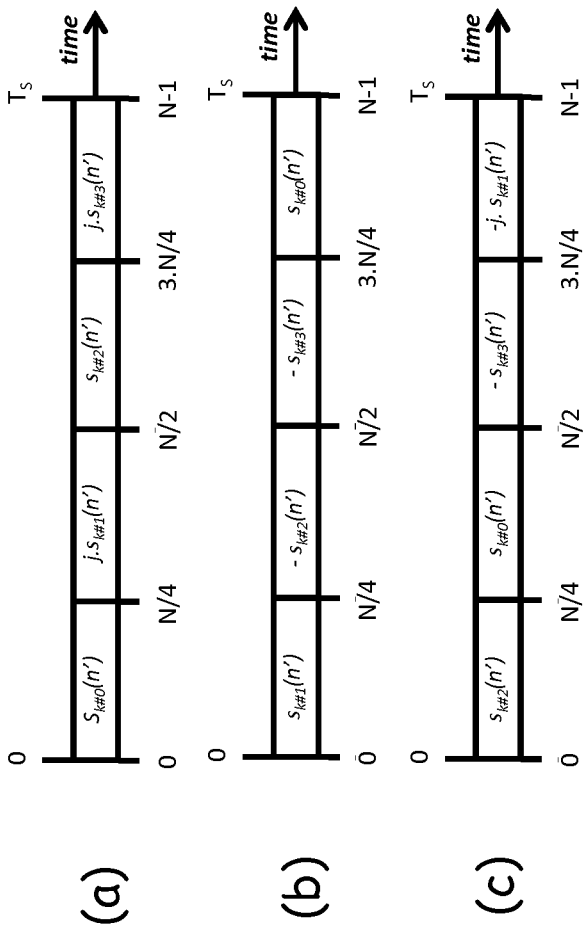
FIGS. 3(a) to 3(c) illustrate three possible built symbols according to an embodiment of the present invention.

As an example, assume the time-multiplexed built symbol for transmission is (while taking into account the temporal-diversity properties of the sub-symbol sets):

$$s_{\{k_{\#0}\}}(n') \longmapsto j \cdot s_{\{k_{\#1}\}}(n') \longmapsto s_{\{k_{\#2}\}}(n') \longmapsto j \cdot s_{\{k_{\#3}\}}(n')$$

as illustrated in FIG. 3(a), any of the 4!=24 different combinations of the time-multiplexed sub-symbols to generate the built symbol for transmission can be expressed as:

$$[s(\tau)] = \mathbb{P} \cdot \begin{bmatrix} s_{\{k_{\#0}\}}(n') \\ j \cdot s_{\{k_{\#1}\}}(n') \\ s_{\{k_{\#2}\}}(n') \\ j \cdot s_{\{k_{\#3}\}}(n') \end{bmatrix} \quad (26)$$

where $\tau=0, \ldots, (N-1)$, and $\mathbb{T}$ is a (4×4) "Permutation" matrix that defines the four selected time-multiplexed sections of the built symbol for transmission. Each row and each column of the matrix $\mathbb{T}$ contains only one coefficient (±1 or ±j).

3 of the 24 possible built symbols for transmission are provided as three examples (e) to (g) with a matrix expression as below and also respectively illustrated in FIGS. 3(a) to 3(c).

$$(e)\mathbb{P} = \begin{bmatrix} 1 & 0 & 0 & 0 \\ 0 & 1 & 0 & 0 \\ 0 & 0 & 1 & 0 \\ 0 & 0 & 0 & 1 \end{bmatrix}$$

$$(f)\mathbb{P} = \begin{bmatrix} 0 & -j & 0 & 0 \\ 0 & 0 & -1 & 0 \\ 0 & 0 & 0 & j \\ 1 & 0 & 0 & 0 \end{bmatrix}$$

$$(g)\mathbb{P} = \begin{bmatrix} 0 & 0 & 1 & 0 \\ 1 & 0 & 0 & 0 \\ 0 & 0 & 0 & j \\ 0 & -1 & 0 & 0 \end{bmatrix}$$

The above-mentioned additional arithmetic computations performed by the transmitter can also be applied to the built symbol for transmission through multipath propagation channels, provided that a guard interval is prepended to each built symbol generated by the execution of the method of the invention. This allows to absorb an inter-symbol interference (ISI) noise. With a maximum L-multipath delay spread $\Delta_{max}$, the duration v of the guard interval must verify:

$$v \geq \Delta_{max} \quad (27)$$

A clever insight of the sectional symbol structure provides a subtle way to prepend a Cyclic Prefix to a built symbol in order to avoid discontinuities within the receiver N-FFT window, and hence to eliminate inter-symbol interference (ISI) and inter-carrier interference (ICI) between received built symbols.

Figure 4:
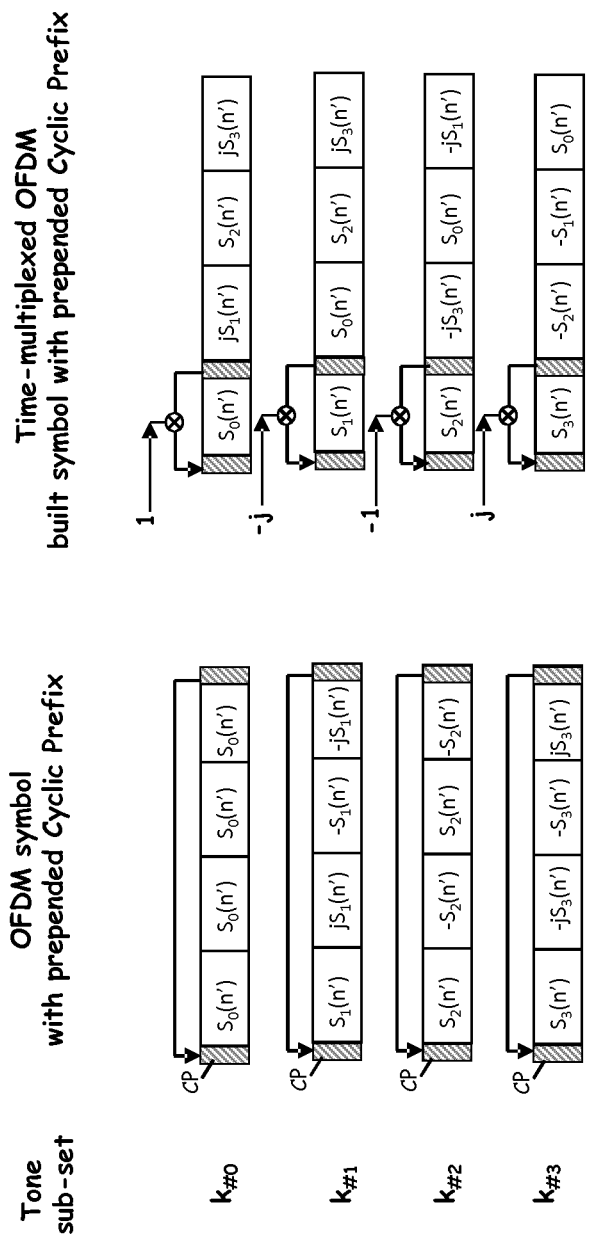
FIG. 4 illustrates a method to prepend a cyclic prefix to the time-multiplexed built symbol according to an embodiment of the present invention.

Each of the four (M=4) tone sub-sets $\{k_{\#q}\}$ with q=0, 1, 2, 3 generates four distinct OFDM symbols with their own temporal diversity. In OFDM systems, a step of prepending a Cyclic Prefix consists to concatenate the last v samples of the OFDM symbol at the up-front beginning of each OFDM symbol before transmission. In other words, the ν samples of the end of the OFDM symbol are prepended to the beginning of the successively following OFDM symbol. So, instead of transmitting x=[x(0) x(1) . . . x(N−1)], the sequence of the time-domain samples $x_{CP}$=[x(N−ν) . . . x(N−1), x(0) x(1) . . . x(N−1)] is transmitted instead. FIG. 4(a) shows the time domain sequence of a CP prepended to an OFDM symbol.

FIG. 4(b) represents four distinct CP-prepended and time-multiplexed sections to form four distinct built symbols for transmission, each built symbol starts with one of the four distinct sections $s_{\{k\#0\}}(n')$, $s_{\{k\#1\}}(n')$, $s_{\{k\#2\}}(n')$ and $s_{\{k\#3\}}(n')$. The same procedure of an OFDM cyclic prefix insertion cannot be applied to the time-multiplexed built symbol because it will introduce discontinuities at the boundary of the cyclic prefix and the first section of the time-multiplexed built symbol. In order to insert a cyclic prefix according to the present invention to the time-multiplexed built symbol while avoiding discontinuities, we must take into account the temporal diversity of each section used to generate the built symbol.

As an example with M=4, when the time-multiplexed built symbol starts with the section $s_{\{k\#0\}}$, the cyclic prefix comprises the last ν samples of the section $s_{\{k\#0\}}$ and is prepended to the time-multiplexed built symbol. When the time-multiplexed built symbol starts with the section $s_{\{k\#1\}}$, the cyclic prefix comprises the last ν samples of the section $s_{\{k\#1\}}$ multiplied by '−j' and then prepended to the time-multiplexed built symbol. The other time-multiplexed build symbols starting with other sections are represented in FIG. 4(b) as well.

At the receiver, the inverse of the transmitter's DSP (Digital Signal Processing) operations will be performed at the output of the ADC(s) to reconstruct the original time-domain OFDM samples contained in the built symbol which are further processed by an OFDM receiver.

In order to reconstruct the N samples of the original OFDM symbol when the built symbol has propagated through an L-multipath channel, the cyclic prefix of the first arrival or the stronger time-multiplexed received built symbols is removed prior to apply the inverse temporal diversity DSP that has been applied at the transmitter.

Hence, the received built symbols according to the present invention can be demodulated by utilizing an OFDM receiver with a single-tap complex multiplier frequency-domain equalizer, whether the signal is transmitted through a LOS (Line-Of-Sight) or a multipath channel (Non-LOS only or (LOS+Non-LOS)).

Similar to the transmitter, compared with the computations performed by an OFDM system without applying the method of the present invention to reduce the PAPR, the additional computations are negligible while maintaining the system performance and can be implemented by software using a very low power and very low-cost DSP processor core.

According to an embodiment of the invention, the method of the present invention applies to any values of M=$2^p$ with p=1, 2, 3 . . . (i.e., p∈$\mathbb{N}^+$ and p≥1). By utilizing the intrinsic temporal diversity properties of the N-IFFT modulator, M sub-symbols (sections) are generated, each section carrying a disjoint tone sub-set comprising N/M orthogonal modulated tones given by:

Section #0 containing the tone sub-set #0: $\{k_{\#0}\}=2^p m$
Section #1 containing the tone sub-set #1: $\{k_{\#1}\}=2^p m+1$
Section #2 containing the tone sub-set #2: $\{k_{\#2}\}=2^p m+2$
. . .
Section #(M−1) containing the tone sub-set #(M−1):

$$\{k_{\#(2^p-1)}\}=2^p m+(2^p-1) \tag{28}$$

with m∈$\mathbb{N}^+$ (m=1, 2, . . . )

The PAPR value during the transmission of the built symbol is thus reduced since now only N/M tones, instead of N tones, are used per sub-symbol that are time-multiplexed to generate the built symbol for transmission. In addition, the built symbol has still the duration $T_S$ and is still carried by N tones, so it has the same throughput of an OFDM system and furthermore can be demodulated by an OFDM receiver.

It should be noted that the cyclic prefix guard interval does not affect the PAPR value nor its related value of complementary cumulative distribution function CCDF (PAPR). A multi-carrier system, like an OFDM system, is actually specified using the statistics of the PAPR value. This is because the highest PAPR value of the multi-carrier signal results from inputs data causing all of the N modulated tones to be added constructively. Such worst case occurs in fact very rarely so that the upper bound of the PAPR value may be over-dimensioned for system specifications. A commonly used reference for system specifications is the complementary cumulative distribution function (CCDF) defined as the probability that PAPR exceeds a specified value; i.e. CCDF (PAPR)=Prob{PAPR>$PAPR_{specified}$}.

It is also noteworthy that, in some embodiments of the invention, the guard interval filled in by the cyclic prefix that extends the duration of the built symbol may result in slightly reducing the overall system capacity (which also exists for an OFDM system). Nevertheless, the utilization of a cyclic prefix guard interval provides the simplest means for the receiver to utilize a frequency-domain equalization (FEQ) allowing the use of a single complex-Tap multiplication per tone.

The slight decrease of system capacity due to the insertion of the cyclic prefix guard interval can be retrieved back due to a significant reduction of the CCDF(PAPR) value of the built symbol, which leads to a much less Input-Back-Off (IBO) and/or Output-Back-Off (OBO) values of a power amplifier at the transmitter. The reduction of the IBO/OBO values provides larger gain and efficiency of the power amplifier. The transmitted signal power can be thus slightly increased to increase a corresponding received Signal-to-Noise Ratio (SNR), and thus increase the modulation rank for some tones resulting in increased system capacity. Therefore, some trade-off compromises between acceptable power consumption and a desired system capacity should be taken into account.

The invention is neither limited to the generation of the cyclic prefix guard interval; other guard interval generation methods can be applied without departing from the scope of the present invention.

Figure 5:
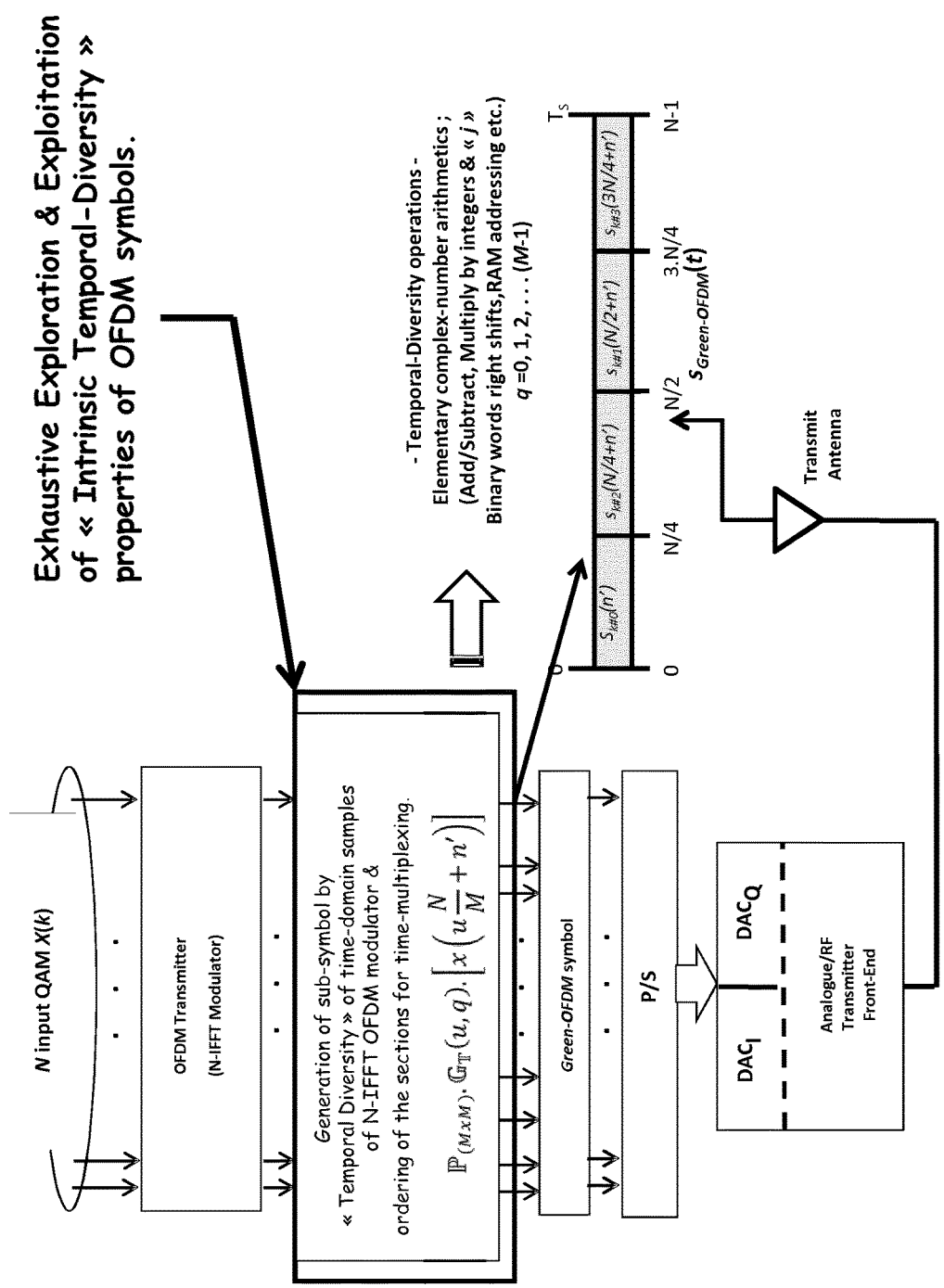
FIGS. 5 and 6 respectively illustrate an example of a transmitter implementing the <<Temporal Diversity>> and a receiver implementing the <<Inverse Temporal Diversity>> to regenerate the samples of the original OFDM symbol according to an embodiment of the present invention (the insertion of the prepended cyclic prefix and appended cyclic suffix performed at the transmitter and the removal of the cyclic prefix and cyclic suffix at the receiver are not shown in FIGS. 5 and 6 for the sake of clarity).
Figure 6:
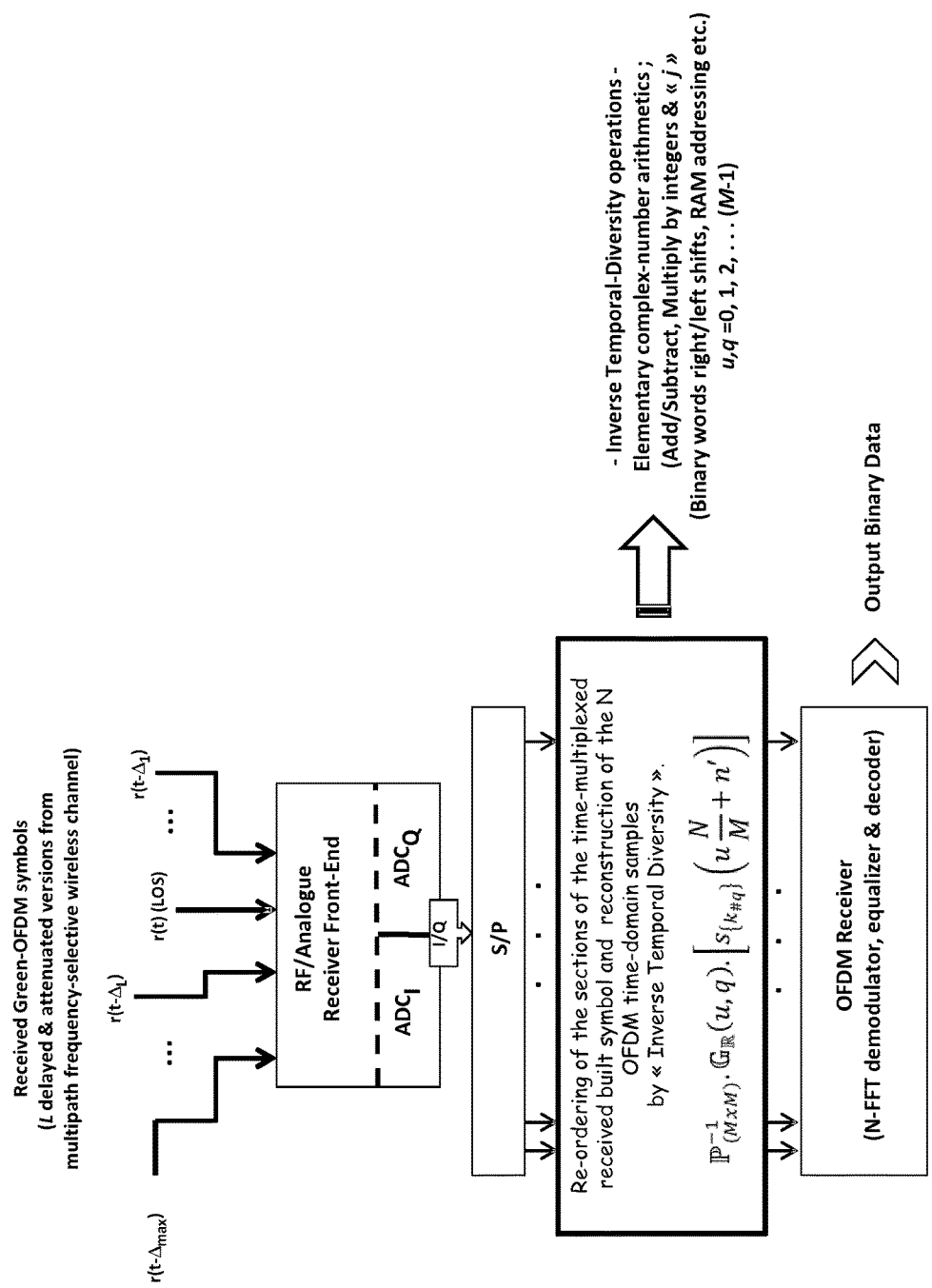

FIGS. 5 and 6 respectively illustrate an example of the transmitter and the receiver utilized in the above-mentioned embodiments. Other implementations and/or structures of the transmitter and/or receiver compatible with the method of the invention can be applied without departing from the scope of the present invention.

The transmitter according to the invention comprises at least one processor programmed to perform the method for generating a built symbol described as above. The built symbol is then transmitted to a receiver to be demodulated. According to the invention, the built symbol can be demodulated in at least two ways.

In a preferred embodiment, the built symbol for transmission received by a receiver can be demodulated by applying an inverse of the above-mentioned temporal-diversity arithmetic computations (which are performed at the transmitter) to symbol samples of the received built symbol, in order to generate desired symbol samples.

The desired symbol samples are identical to the symbol samples which can be obtained by transmitting directly the original symbol (without generating the built symbol) and demodulating the transmitted original symbol received by a receiver.

In the above-mentioned embodiment illustrating the step of prepending a cyclic prefix to the built symbol according to the invention, the receiver can be implemented with using an OFDM receiver comprising, among other functional macroblocks, an N-FFT demodulator.

According to the invention, the received built symbol can be also demodulated by performing a method for demodulating a built symbol "sub-symbol by sub-symbol" (or "section by section") until all the sub-symbols of the built symbol are demodulated, in order to benefit from the structure of the built symbol and make high throughput communication systems much more robust against Doppler spreads as compared with existing conventional OFDM transceivers.

In a preferred embodiment of the invention, the sub-symbols contained in the built symbol are time-multiplexed and thus preferably generated in a chronological order that reflects the temporal sequence of the data stored in the original symbol. Such chronological order can be advantageously utilized while transmitting the sub-symbols of the built symbol from the transmitter to the receiver, and the built symbol received at the receiver are demodulated, preferably, "sub-symbol by sub-symbol" in such chronological order.

Indeed, the performance degradation of OFDM systems due to Doppler spreads is directly dependent upon the tone spacing. The larger is the tone spacing, the less is the OFDM system degraded by Doppler spreads. Since the built symbol is time-multiplexed of the M OFDM sub-symbols with M times larger tone spacing as compared with that of the original OFDM symbol, the system is de-facto M times more robust against Doppler shifts. To benefit from this property, the associated receiver maintains preferably this large tone spacing while demodulating one sub-symbol of the built symbol by another one sub-symbol of the built symbol. The method for demodulating scheme is described here below.

The first sub-symbol $s_{\{k_{\#q}\}}$ is not be affected by the previous received built symbol because an ISI noise is absorbed within the v samples of the cyclic prefix of the built symbol which will be removed at the receiver and thus there is no inter-carrier interference (ICI) noise, either. However, the tone spectrum of each sub-symbol is widened because each sub-symbol last $T_S/M$, and so the orthogonal tone sub-set $\{k_{\#q}\}$ is not orthogonal with the tone sub-set $\{k_{\#q'}\}$ ($q \neq q'$)).

The spectrum of a sub-symbol $$s_{k_{\#q}}\left(u\frac{N}{M}+n'\right)$$

will affect tones $k' \in \{k_{\#q'}\}$ utilized by a following adjacent time-multiplexed sub-symbol $$s_{\{k_{\#q'}\}}\left((u+1)\frac{N}{M}+n'\right).$$

Figure 7:
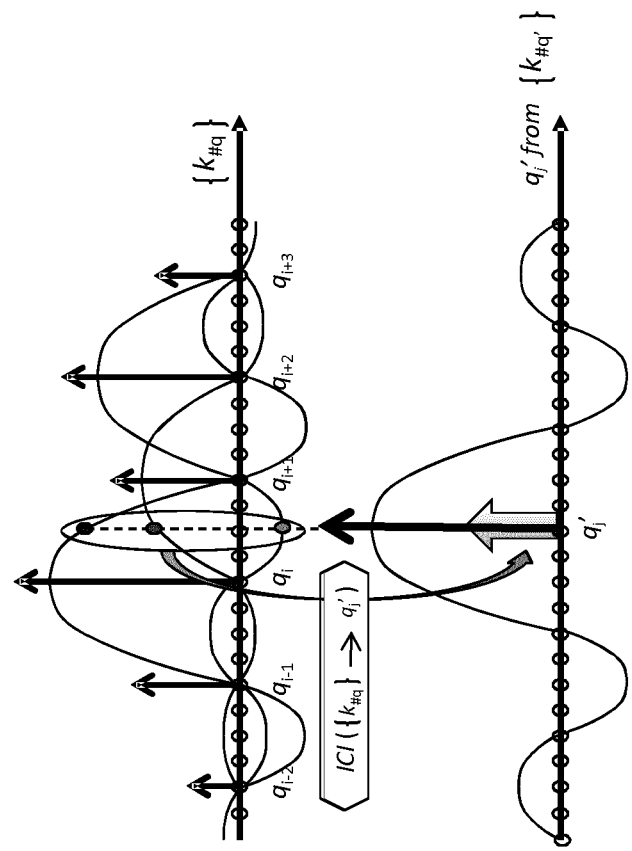
FIG. 7 illustrates an ICI noise from a sub-symbol to the $j^{th}$ tone of the tone sub-set utilized by the following adjacent sub-symbol according to an embodiment of the present invention.

One of the specific cases of the ICI noise from the sub-symbol $$s_{\{k_{\#q}\}}\left(u\frac{N}{M}+n'\right)$$

to the $j^{th}$ tone $q'_i$ of the sub-symbol $$s_{\{k_{\#q'}\}}\left((u+1)\frac{N}{M}+n'\right)$$

is illustrated in FIG. 7 (wherein only the ICI noise on the $j^{th}$ tone $q'_j \in \{k_{\#q'}\}$ is shown).

The ICI noise from the tone sub-set $\{k_{\#q}\}$ of the sub-symbol $$s_{\{k_{\#q}\}}\left(u\frac{N}{M}+n'\right)$$

on the $j^{th}$ tone $q'_j \in \{k_{\#q'}\}$ to the following adjacent time-multiplexed sub-symbol $$s_{\{k_{\#q'}\}}\left((u+1)\frac{N}{M}+n'\right),$$

that we denote ICI $[\{k_{\#q}\} \rightarrow q'_j]$ is given by:

$$ICI[\{k_{\#q}\} \rightarrow q'_j] = \Sigma_{q \in \{k_{\#q}\}} X_R(q) \cdot \text{sinc}(q'_j - q) \quad (29)$$

where $X_R(q) = H(q) \cdot X(q)$, wherein $H(q)$ is defined as the frequency-domain channel transfer function at tone q.

Eq. (29) can also be written in a matrix representation as indicated in the following Eq. (30) (wherein $$\rho = \frac{N}{M}\right):$$

$$ICI[\{k_{\#q}\} \rightarrow q'_j] = \begin{bmatrix} X_R(q_0) & X_R(q_1) & \ldots & X_R(q_{\rho-1}) \end{bmatrix} \cdot \begin{bmatrix} \text{sinc}(q'_j - q_0) \\ \text{sinc}(q'_j - q_1) \\ \vdots \\ \text{sinc}(q'_j - q_{\rho-1}) \end{bmatrix} \quad (30)$$

For all tones $q'_j$ corresponding to the tone sub-set $\{k_{\#q'}\}$ (j=0, 1, ... ($\rho$−1)), we have:

$$ICI[\{k_{\#q}\} \rightarrow \{k_{\#q'}\}] = [\text{sinc}(q'_j - q_i)] \cdot [X_R(q_i)] \quad (31)$$

with

-continued $$[\text{sinc}(q'_j - q_i)] = \begin{bmatrix} \text{sinc}(q'_0 - q_0) & \text{sinc}(q'_0 - q_1) & \cdots & \text{sinc}(q'_0 - q_{\rho-1}) \\ \text{sinc}(q'_1 - q_0) & \text{sinc}(q'_1 - q_1) & \cdots & \text{sinc}(q'_1 - q_{\rho-1}) \\ \vdots & \vdots & \vdots & \vdots \\ \text{sinc}(q'_{\rho-1} - q_0) & \text{sinc}(q'_{\rho-1} - q_1) & \cdots & \text{sinc}(q'_{\rho-1} - q_{\rho-1}) \end{bmatrix}$$

In a preferred embodiment, the ICI cancellation stage comprising not only performing but also computing and storing beforehand the above matrix [sinc($q'_j-q_i$)] off-line. Said matrix can be stored in a memory within a transceiver integrated circuit.

Figure 8:
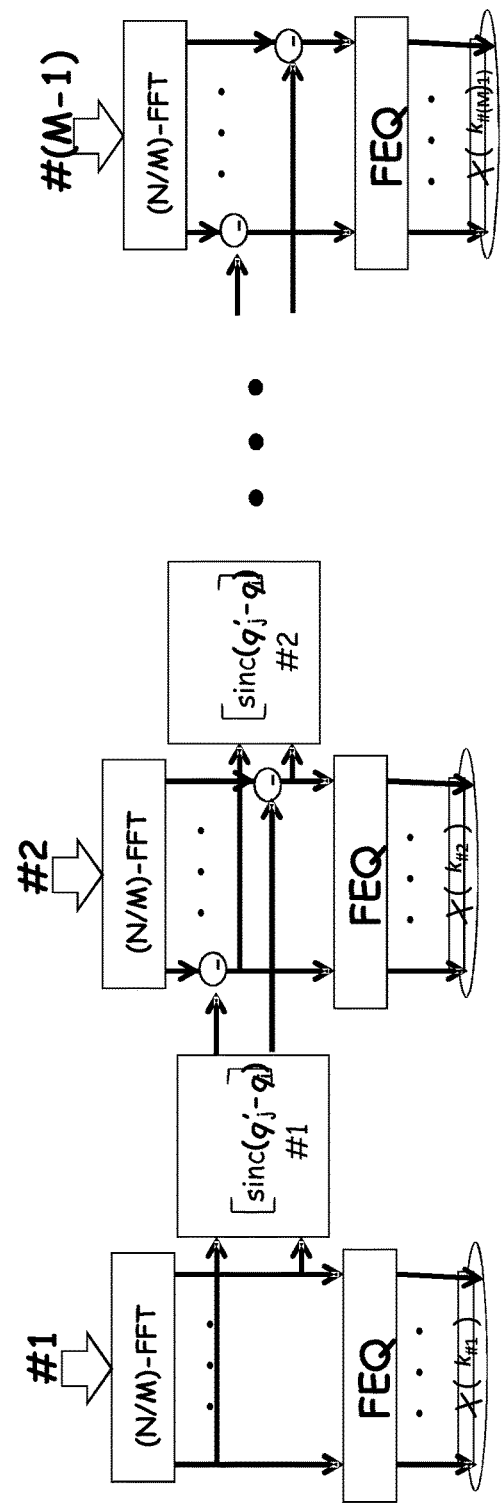
FIG. 8 illustrates a <<sub-symbol by sub-symbol>> chronologically cascaded demodulation process which benefits from the structure of the built symbol to make the system M times more robust against Doppler spreads while avoiding a relatively high degree of computational complexity of existing Doppler-compensation algorithms.

A <<sub-symbol by sub-symbol>> demodulation process for the M sub-symbols of the built symbol is illustrated in FIG. 8.

The first sub-symbol $s_{\{k_{\#q}\}}(n')$, can be processed alone by $$a\frac{N}{M} - FFT,$$

and the 1-tap complex coefficient equalizer to output the $X(k_{\#q})$ because there is no ISI noise from the previous received built symbol nor ICI noise. The complex coefficients of the equalizer are the frequency-domain representation of the multipath channel transfer function for the tones of the tone sub-set $\{k_{\#q}\}$ of the first sub-symbol $s_{\{k_{\#q}\}}(n')$.

Examples of complex equalizer coefficients are:

(a) Zero-Forcing (ZF): (32.a)

$$FEQ_1 = \frac{\mathcal{H}^*(q)}{|\mathcal{H}(q)|^2} \ \forall \ q \in \{k_{\#q}\}$$

(b) Minimum Mean Square Error (MMSE): (32.b)

$$FEQ_2 = \frac{H(q)}{|H(q)|^2 + \sigma_n^2}$$

The invention is not limited to the above channel equalizer algorithms (such as those indicated in Eqs. (32)). Other channel equalizer algorithms can be performed without departing from the scope of the present invention.

This demodulation process is preferably performed in a cascaded way (i.e. chronologically) until all time-multiplexed sub-symbols of the built symbol are processed by a $$a\frac{N}{M} - FFT$$

demodulator, and the ICI cancellation stage performed to remove the ICI noise from the previous sub-symbol is thus finally equalized by its 1-Tap complex multiplication of the associated equalizer.

Figure 9:
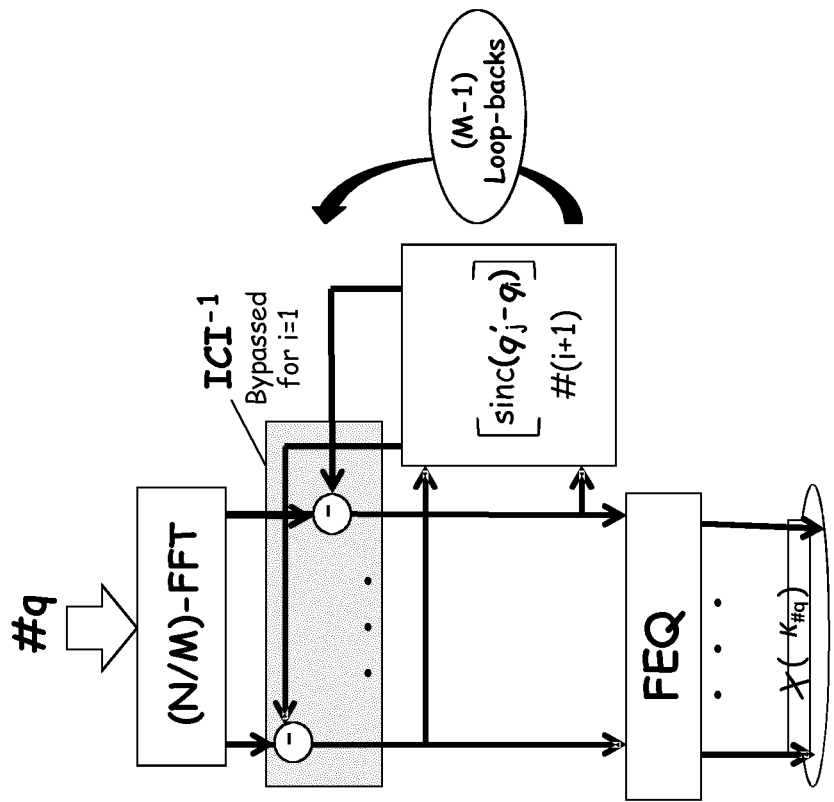
FIG. 9 illustrates a (M−1) times loop-back receiver architecture in Doppler spread channels using a single $$\frac{N}{M} - FFT$$

Furthermore, instead of implementing the receiver demodulator utilizing $$M \times \left(\frac{N}{M} - FFT\right),$$

the demodulation of all of the sub-symbols of the built symbol can be performed with using a single $$\frac{N}{M} - FFT$$

in a loop-back receiver architecture as represented in FIG. 9. The implementation of a Doppler-compensation macroblock is no longer mandatory as the impact on the system performance due to the Doppler effect is directly related to the modulated tones spacing. Therefore, with the invention, the implementation of the Doppler-compensation macroblock is optional unless in a case where extremely high speed mobile devices are connected to the communication system. In case Doppler-compensation algorithm(s) are necessary to be implemented for obtaining an acceptable system performance, its implementation is specified by a compromise between the relationship of the system specifications and $M=2^p$ which defines the modulated tones spacing. Anyhow, In case Doppler-compensation algorithm(s) must be applied, one appropriate existing Doppler-compensation method can be performed at the receiver according to the invention.

FIG. 10 illustrates a receiver macroblock architecture comprising the optional Doppler-compensation macroblock with the loop-back configuration according to an embodiment of the invention. The receiver macroblock architecture is utilized for example in a case of extremely large Doppler spread channels.

As mentioned above, there is no need to perform the ICI cancellation stage for the demodulation of the first sub-symbol of the built symbol, the ICI cancellation stage of the method for demodulating preferably performed on each of the (M−1) sub-symbols (from the $2^{nd}$ to the $(M-1)^{th}$ sub-symbols) comprises performing $$\left(\frac{N}{M}\right)^2$$

multiply-accumulate (MACs) operations.

Since there are M sub-symbols to be demodulated preferably chronologically in order to demodulate all the N modulated-tones of the built symbol, a total computational complexity of the ICI cancellation stage repeatedly performed is given by:

$$M \cdot \frac{MACS}{\text{stage}} \cong \frac{N^2}{M} \Rightarrow O(N^2) \quad (33)$$

where $O(x^2)$ means <<on the order of $x^2$>>.

Eq. (33) indicates that, compared with the FFT computations performed by the receiver, the ICI cancellation stages performed in a cascaded way make the most computational complexity. However, the arithmetic computations of the ICI stages can be significantly reduced by considering the decay of the sinc-function side lobes that are reduced by 6 dB per octave.

For instance, by fixing the ICI-cancellation to ±32 side-lobes from each disturbing tones of the previous section, we have [(−6 dB×5)+3 dB]=−27 dB remaining ICI noise, that is about 0.2%; actually, it is even less than 0.2% because the successive side lobes of the sinc-function alternate in positive/negative signs. For example, the first side lobe has a negative sign, the second side lobe has a positive sign, and so forth.

The ICI noise at the receiver can further be reduced by an appropriate <<Pulse-Shaping>> method performed by the transmitter according to the invention, such as Rectangular pulse (REC), Raised Cosine pulse (RC), Better than Raised Cosine pulse (BTRC), Sinc Power Pulse, and Improved Sinc Power pulse (ISP), etc.

$$P_{REC}(f) = \text{sinc}(fT_S) \tag{33.a}$$

$$P_{RC}(f) = \text{sinc}(fT_S) \cdot \frac{\cos(\pi\alpha fT_S)}{1-(2\alpha fT_S)^2} \tag{33.b}$$

$$P_{BTRC}(f) = \text{sinc}(fT_S) \cdot \frac{[2\beta fT_S \cdot \sin(\mu\alpha fT_S) + 2\cos(\pi\alpha fT_S) - 1]}{1+(\beta fT_S)^2} \tag{33.c}$$

$$P_{SP}(f) = \text{sinc}^n(fT_S) \tag{33.d}$$

$$P_{ISP}(f) = \exp\{-a(fT_S)^2\} \cdot \text{sinc}^n(fT_S) \tag{33.e}$$

where $\alpha$ ($0 \leq \alpha \leq 1$) is the rolloff factor, $\beta = \pi\alpha/\ln 2$, $a$ is a design parameter to adjust the amplitude and n is the degree of the sinc function. FIG. 11 presents a comparison of the above-mentioned REC, RC, BTRC, SP, and ISP spectrum.

Advantageously, a pulse shaping function is applied within the cyclic prefix prepended to the beginning and an additional cyclic suffix appended at the end of the built symbol. It should be noted that the pulse shaping function could be implemented in utilizing any of known methods in the art. The invention is nevertheless not limited to the implementation of the pulse shaping function.

With a similar reasoning as for the above-mentioned step of prepending a cyclic prefix, a step of appending a cyclic suffix to the end of the built symbol can be performed.

According to a preferable embodiment of the present invention, the first µ samples of the last sub-symbol of the time-multiplexed built symbol are appended to the end of the built symbol as illustrated in FIG. 12 for the example wherein M=4.

FIG. 11 illustrates that the Improved Sinc Power pulse (ISP) function has the lowest spectral side lobes and that nearly 100% of the power is contained in the main central lobe. This property of the ISP windowing spectrum can be beneficially exploited within the ICI-cancellation stage macroblock according to the invention since only the disturbing main lobes of the tones of the previous section need to be removed.

Given the definition of the tone sub-set for each of the M sub-symbols of the built symbol, this requires only two multiplications followed by one add and one subtract for each tone of the tone sub-set per sub-symbol. Thus, in an OFDM system using N tones and M sub-symbols, ≈2N MACs per built symbol are required to be performed. In an example of a built symbol carried by 32K-tones DVB-T2, only 64 kMACs per built symbol, and thus only ≤50 MFLOPS of additional computations, which can be considered as insignificant.

Secrecy has always been an important mandatory requirement for commercial and military communication systems, particularly for the latter. Due to the broadcast nature of wireless transmissions, communication over the wireless medium is often vulnerable to signal interception or eavesdropping by unauthorized receivers.

Conventionally, these secrecy issues occur mostly in the upper layers of the network protocol stack using a cryptographic encryption and decryption method, such as methods using the Data Encryption Standard (DES) and the Advanced Encryption Standard (AES). As the computational power ever increases, the computational challenges of certain mathematical problems, for which the encryption and decryption are based on, may no longer exist, which may lead to the deficiency of many current cryptosystems.

In order to further enhance the secrecy on top of the input data encryption, a physical-layer secrecy applied appropriately on the transmitted waveform would prevent any unauthorized eavesdropper(s) from obtaining, demodulating and decoding the signal in a correct way.

According to the present invention, the above-mentioned M! possible permutations allow to time-multiplex distinct M sub-symbols to generate the built symbol for transmission, and the secrecy of the communication system at the physical-layer is thus increased to prevent any unauthorized eavesdropper from demodulating, equalizing and decoding the received signal, while maintaining all the advantages of the present invention.

Taking an example where an eavesdropper knows that the signal is a time-multiplexed built signal generated according to the present invention, he would need first to synchronize the received symbols in order to further perform the inverse temporal diversity algorithm to reconstruct the OFDM symbols for demodulating, equalizing and decoding. The symbol synchronization might be able to be achieved by performing a time-domain correlation of the cyclic prefix with all the received time domain samples of the received symbol.

However, the eavesdropper does neither have the information of the value M, nor the order of the sub-symbols within the time-multiplexed built symbol for transmission. The periodicity introduced by the usage of the cyclic prefix can be explored by the eavesdropper to synchronize the received built symbols. Nevertheless, after achieving received symbol synchronization, and in a case where he knows the value of M (which is actually not a general case), he would still need to perform inverse temporal diversity of M! permutations of sub-symbols and N-FFT and equalization for each of the M! permutations before selecting an eligible valid decoded received built symbol.

It should be noted that the selection of an eligible valid decoded message might require several decoded symbols, so that it makes even more difficult for the eavesdropper to decode the valid message from a single built symbol.

In order to make it more difficult for the eavesdropper to synchronize the received symbol, an initial training sequence between the authorized communicating users can use a time-multiplexed built symbol with several cyclic prefixes inserted between the sub-symbols that form the built symbol for transmission. Therefore, the eavesdropper would encounter more difficulties to determine a correct start of the received built symbol and would need to perform much more inverse temporal diversity computations and associated N-FFTs and equalizations before deciding on a supposedly correct received symbol boundaries.

It should be noted that extraction of the synchronization parameters by using the cyclic prefix(es) with only one received built symbol is very difficult and nearly impossible, since the cyclic prefix(es) are perturbed by multipath components and additive noises.

Now, given a most favorable case to the eavesdropper, that is, he has acquired the capability to synchronize the received symbols boundaries. The secrecy of the present invention can be increased by, but not limited to, performing any of the following alternative steps whether taken separately or in combination:

Using different orders of the sub-symbols for the succeeding time-multiplexed built symbols, wherein the utilized orders are known only by the authorized communicating users, Inserting several cyclic prefixes and/or cyclic suffixes at predetermined time-locations, only known by the authorized communicating users, within the time-multiplexed built symbols, The number M of sub-symbols within the time-multiplexed symbols is not a constant value; instead, it varies in a Pseudo-Random Sequence (PRS) for the succeeding built symbols. The PRS is synchronized between the authorized communicating users and may be preferably hidden inside the exchanged message only between the authorized communicating users, so that the unauthorized eavesdropper cannot capture and decode the PRS. A simple example of a PRS for the number M with the values respectively of 4, 8 and 16 is M=4→4→16→8→8→8→16→16→4→4→4→4→8→16 and so forth.

Inserting a certain number of same sub-symbols within the time-multiplexed built symbols, wherein the certain number is only known by the authorized communicating users. In this case, instead of M! possible time-multiplexed built symbols, there are $M^M$ possible time-multiplexed built symbols. The authorized users demodulate the received symbols by setting to zeroes the copies of the same sub-symbols prior to applying the inverse temporal diversity algorithm and the N-FFT for demodulation.

It should be noted that other implementations and/or structures of the time-multiplexed built symbol compatible with the invention could be applied without departing from the scope of the present invention.

The above-mentioned four alternative steps of increasing the secrecy at the physical-layer of the orthogonal multi-carrier communication system are illustrated in FIG. 13 according to an embodiment of the invention. Therefore, the physical-layer secrecy steps as described above provide a very safe communication between authorized users because the eavesdropper would not be able to decode the received signal even if he has an enormous computational capability much beyond the computation power of the equivalent transceiver of the corresponding communication system.

It is noteworthy that well-specified dedicated design, whether in hardware, in software, or in a mix of hardware and software, can make this second receiver architecture backward compatible with an OFDM receiver.

The receiver according to the invention comprises at least one processor programmed to perform the method for demodulating a built symbol generated by performing the method for generating a built symbol.

The following list is provided for ease of the comprehension of the method according to the invention, especially concerning at least parts of the steps of the invention:

At the transmitter:
Exhaustive exploration and exploitation of the <<Temporal-Diversity>> properties of the original OFDM symbol of the OFDM signal to generate M time-multiplexed OFDM sub-symbols, with N/M data-modulated orthogonal tones per sub-symbol, from a single OFDM modulator;
Each time-multiplexed sub-symbol is carried by distinct N/M preferably equi-distant orthogonal data-modulated tones with $\Delta f=M/T_S$, where $T_S$ is the duration of the original OFDM symbol;

The temporal-diversity properties of the original OFDM symbols provide a partitioning of the N tones of the original OFDM symbol into $M=2^p$ disjoint orthogonal tone sub-sets (p being an integer $\geq 1$);
The M sub-symbols (sections) are time-multiplexed without a guard interval in between to generate the built symbol (notice that since each sub-symbol uses distinct tone sub-set with a tone spacing of $M/T_S$, the duration of each sub-symbol is $T_S/M$ and thus the duration of the built symbol is equal to the duration of the original OFDM symbol);
Prepending a cyclic prefix according to the above-mentioned method compliant with the built symbol;
Appending a cyclic suffix according to the above-mentioned method compliant with the built symbol;
Performing a pulse shaping function within the cyclic prefix and the cyclic suffix compliant with the built symbol.
Providing the freedom of choosing and ordering the sub-symbols that are inserted within the time-multiplexed built symbol to increase physical-layer secrecy of the orthogonal multi-carrier communication system.

At the receiver:
Applying the inverse <<Temporal-Diversity>> properties of the transmitter to the output samples of the ADC(s) in order to generate time-domain samples equal to the received input samples of an OFDM complex N-point FFT demodulator;
Another receiver architecture consisting of a demodulation performed in a cascaded way (i.e. chronologically) using $$\frac{N}{M} - FFTs.$$

This receiver architecture exploits the built symbol structure to make high throughput communication systems with improved Doppler spread robustness.

In summary, with a holistic view-point, the transmitter (which is for example located in a base station) and the receiver (which is for example in a remote fixed or mobile device) utilizing the method of the invention has a very low implementation complexity (digital and analogue), and an unprecedented overall ultra-low power consumption compared with an OFDM system without any PAPR reduction technique applied.

Moreover, when compared with existing methods utilized for reducing the PAPR value of an OFDM signal, the present invention provides the following technical advantages:
Ultra-low and pre-determined PAPR and CCDF(PAPR) without any iteration,
Insignificant digital implementation complexity that can readily be implemented in DSP-software on top of an OFDM transceivers (i.e., transmitter and receiver),
Ultra-low power transmitter analogue front-end (DAC(s) & HPA), and a consequently ultra low-cost OFDM transceiver,
No in-band distortion,
No power leakage, hence fully compliant with legacy systems in use,
No side information required, hence no loss of capacity,
No bandwidth expansion,
The method for generating a built symbol and/or the method for demodulating executed in the transmit-receive transceiver can be switched-off, so that the system is able to be fully backward compatible with OFDM mode of operation, Compromise on the obtained reduction of power consumption by allowing slightly less reduction of power consumption and increasing the SNR per tone, which brings at least one of the following advantages:
(i) increasing in transmission throughput (i.e., increasing the transmission capacity), or
(ii) increasing the SNR margin.

As mentioned above, the receiver can be implemented in a different way than reversal of temporal-diversity used in the transmitter. This alternative receiver exploits the intrinsic improved robustness against Doppler spreads due to the M times larger tone spacing of each of the M time-multiplexed sections that form the built symbols by temporal-diversity at the transmitter. With this alternative receiver implementation, that can be also made backward compatible with OFDM mode of operation if the associated DSP operations are switched-OFF at both transmitter and receiver. The present invention provides the freedom of choosing and ordering the sub-symbols within the time-multiplexed built symbol to increase the secrecy of the orthogonal multi-carrier communication system.

Furthermore, some of the features of the exemplary embodiments of this invention may be used to advantage without the corresponding use of other features. As such, the foregoing description should be considered as merely illustrative of the principles, teachings and embodiments of this invention, and not in limitation thereof.

The invention claimed is:

1. A method for generating a built symbol comprising a plurality of sub-symbols for transmission comprising data of an original symbol of an orthogonal multi-carrier modulation signal in order to reduce the peak-to-average power ratio (PAPR) of the orthogonal multi-carrier modulation signal, the original symbol lasting for a duration Ts and being carried by N orthogonal tones; the method comprising, by applying the intrinsic temporal-diversity properties of the complex N-points Inverse Fast Fourier Transform to the original symbol, generating the plurality of sub-symbols from the original symbol, wherein:
the number of the generated plurality of sub-symbols is M,
each of the M generated sub-symbols lasts for a duration Ts/M and is carried by N/M orthogonal tones,
the M generated sub-symbols are time-multiplexed.

2. The method of claim 1, comprising further a step of prepending a cyclic prefix to the built symbol, the cyclic prefix being specified by the structure of the built symbol and lasting at least the maximum delay spread of a multipath propagation channel.

3. The method of claim 1, comprising further a step of appending a cyclic suffix to the built symbol, the cyclic suffix being specified by the structure of the built symbol.

4. The method of claim 1, comprising further a step of increasing the secrecy of the built signal, comprising using different orders of the sub-symbols for the succeeding time-multiplexed built symbols, wherein the utilized orders are only known by the authorized communicating users.

5. The method of claim 1, comprising further a step of increasing the secrecy of the built signal, comprising inserting several cyclic prefixes and/or cyclic suffixes at predetermined time-locations, only known by the authorized communicating users, within the time-multiplexed built symbols.

6. The method of claim 1, comprising further a step of increasing the secrecy of the built signal, comprising varying the number M of sub-symbols within the time-multiplexed symbols in a Pseudo-Random Sequence (PRS) for the succeeding built symbols, the PRS being synchronized between the authorized communicating users and is preferably hidden inside an exchanged message only between the authorized communicating users so that the unauthorized eavesdropper cannot capture and/or decode the PRS.

7. The method of claim 1, comprising further a step of increasing the secrecy of the built signal, comprising inserting a certain number of same sub-symbols within the time-multiplexed built symbols, wherein the certain number is only known by the authorized communicating users.

8. A method for demodulating a built symbol generated according to the method of claim 1, comprising:
applying an inverse of temporal-diversity arithmetic computations to symbol samples of the built symbol received by a receiver.

9. A method for demodulating a built symbol generated according to the method of claim 1, comprising an inter-carrier interference (ICI) cancellation stage utilized for removing an ICI noise between any two adjacent sub-symbols of the built symbol, the two adjacent sub-symbols respectively carried by two distinct tone sub-sets TS-A and TS-B comprising respectively N/M tones; the ICI cancellation stage comprising:
calculating a sum of amplitudes and phases of the tone sub-set TS-A, including the main lobes and the side lobes, that overlap a tone of the tone sub-set TS-B,
generating a result by subtract said sum that is the ICI noise on the said tone of the tone sub-set TS-B.

* * * * *